(12) United States Patent
Mayleben et al.

(10) Patent No.: US 8,380,355 B2
(45) Date of Patent: Feb. 19, 2013

(54) CAPACITIVE SENSOR AND METHOD AND APPARATUS FOR CONTROLLING A PUMP USING SAME

(75) Inventors: Philip A. Mayleben, Edgewood, KY (US); Thomas R. Stetter, Cincinnati, OH (US)

(73) Assignee: Wayne/Scott Fetzer Company, Westlake, OH (US)

( * ) Notice: Subject to any disclaimer, the term of this patent is extended or adjusted under 35 U.S.C. 154(b) by 1074 days.

(21) Appl. No.: 12/049,906

(22) Filed: Mar. 17, 2008

(65) Prior Publication Data

US 2008/0229819 A1 Sep. 25, 2008

Related U.S. Application Data

(60) Provisional application No. 60/919,059, filed on Mar. 19, 2007.

(51) Int. Cl.
*G06F 19/00* (2006.01)
(52) U.S. Cl. ............... 700/282; 73/114.39; 347/7
(58) Field of Classification Search ............... 700/282; 73/403 C, 114.39; 702/55; 347/7; 417/423.3, 417/40, 53, 36
See application file for complete search history.

(56) References Cited

U.S. PATENT DOCUMENTS

| | | | |
|---|---|---|---|
| 3,399,399 A | 8/1968 | Apfelbaum |
| 3,588,859 A | 6/1971 | Petree |
| 3,634,842 A | 1/1972 | Niedermeyer |
| 3,665,300 A | 5/1972 | Sauer et al. |
| 3,726,606 A | 4/1973 | Peters |
| 3,882,476 A | 5/1975 | Lofgren |
| 3,932,853 A | 1/1976 | Cannon |
| 3,941,507 A | 3/1976 | Niedermeyer |
| 3,951,568 A | 4/1976 | Carlson, Jr. |
| 4,108,574 A | 8/1978 | Bartley et al. |
| 4,137,527 A | 1/1979 | Tennenhouse et al. |
| 4,187,503 A | 2/1980 | Walton |
| 4,222,711 A | 9/1980 | Mayer |
| 4,228,427 A | 10/1980 | Niedermeyer |
| 4,276,454 A | 6/1981 | Zathan |

(Continued)

FOREIGN PATENT DOCUMENTS

| CA | 2420650 | 3/2003 |
|---|---|---|
| EP | 0373809 | 6/1990 |

(Continued)

OTHER PUBLICATIONS

U.S. Patent and Trademark Office, non-final Office Action issued in U.S. Appl. No. 12/617,377, Jun. 1, 2012, 12 pp.

*Primary Examiner* — Kidest Bahta
(74) *Attorney, Agent, or Firm* — Fitch, Even, Tabin & Flannery LLP

(57) ABSTRACT

A variable capacitor for sensing the level of a liquid. The capacitor provides a readable capacitance that varies with respect to the level of the liquid. A pump control system implementing the capacitive sensor to control the level of a liquid by activating and deactivating the pump depending on the level of the liquid. Methods relating to varying capacitance of a capacitive sensor and controlling a pump based on the level of a liquid. A pump controller for controlling the level of a liquid in a reservoir includes a controller and a capacitor. The capacitor is adapted to provide an activation signal to the controller when the liquid in the reservoir reaches a first predetermined level relative thereto. Additionally, the capacitor is adapted to provide a trigger signal to the controller when the liquid in the reservoir reaches a second predetermined level relative thereto. Based on the trigger signal, the controller determines when to deactivate the pump.

30 Claims, 17 Drawing Sheets

U.S. PATENT DOCUMENTS

| | | | |
|---|---|---|---|
| 4,291,261 A | 9/1981 | Johnston | |
| 4,361,835 A | 11/1982 | Nagy | |
| 4,369,438 A | 1/1983 | Wilhelmi | |
| 4,426,271 A | 1/1984 | Yoshida et al. | |
| 4,437,811 A | 3/1984 | Iwata et al. | |
| 4,456,432 A | 6/1984 | Mannino | |
| 4,466,284 A | 8/1984 | Dumery | |
| 4,480,469 A | 11/1984 | Tice | |
| 4,551,068 A | 11/1985 | Boudreaux | |
| 4,554,494 A | 11/1985 | Howeth | |
| 4,589,282 A | 5/1986 | Dumery | |
| 4,598,584 A | 7/1986 | Dombrowski et al. | |
| 4,600,844 A | 7/1986 | Atkins | |
| 4,631,001 A | 12/1986 | Keech | |
| 4,744,808 A | 5/1988 | Treu | |
| 4,766,329 A | 8/1988 | Santiago | |
| 4,800,755 A | 1/1989 | Fathauer | |
| 4,804,944 A | 2/1989 | Golladay et al. | |
| 4,875,497 A | 10/1989 | Worthington | |
| 4,881,873 A | 11/1989 | Smith et al. | |
| 4,920,797 A | 5/1990 | Swartz et al. | |
| 5,015,152 A | 5/1991 | Greene | |
| 5,017,909 A | 5/1991 | Goekler | |
| 5,145,323 A * | 9/1992 | Farr | 417/36 |
| 5,234,319 A | 8/1993 | Wilder | |
| 5,238,369 A * | 8/1993 | Farr | 417/18 |
| 5,283,569 A | 2/1994 | Nelson | |
| 5,287,086 A | 2/1994 | Gibb | |
| 5,404,048 A | 4/1995 | Panner | |
| 5,425,624 A | 6/1995 | Williams | |
| 5,449,274 A | 9/1995 | Kochan, Jr. | |
| 5,483,227 A | 1/1996 | Kuo et al. | |
| 5,549,456 A | 8/1996 | Burrill et al. | |
| 5,565,687 A | 10/1996 | Berrill | |
| 5,594,222 A | 1/1997 | Caldwell | |
| 5,636,548 A | 6/1997 | Dunn et al. | |
| 5,672,050 A | 9/1997 | Webber et al. | |
| 5,696,493 A | 12/1997 | Einck | |
| 5,744,701 A | 4/1998 | Peterson et al. | |
| 5,764,034 A | 6/1998 | Bowman et al. | |
| 5,923,102 A | 7/1999 | Koenig et al. | |
| 6,028,521 A | 2/2000 | Issachar | |
| 6,192,752 B1 | 2/2001 | Blaine | |
| 6,218,948 B1 | 4/2001 | Dana | |
| 6,218,949 B1 | 4/2001 | Issachar | |
| 6,253,611 B1 | 7/2001 | Varga et al. | |
| 6,292,051 B1 * | 9/2001 | Su et al. | 329/313 |
| 6,320,282 B1 | 11/2001 | Caldwell | |
| 6,322,325 B1 | 11/2001 | Belehradek | |
| 6,366,053 B1 | 4/2002 | Belehradek | |
| 6,373,676 B1 | 4/2002 | Baker et al. | |
| 6,375,430 B1 | 4/2002 | Eckert et al. | |
| 6,390,780 B1 * | 5/2002 | Batchelder et al. | 417/36 |
| 6,446,014 B1 * | 9/2002 | Ocondi | 702/45 |
| 6,457,355 B1 | 10/2002 | Philip | |
| 6,462,666 B1 | 10/2002 | Einck | |
| 6,479,915 B2 | 11/2002 | Hsueh | |
| 6,481,973 B1 | 11/2002 | Struthers | |
| 6,499,961 B1 | 12/2002 | Wyatt et al. | |
| 6,557,412 B1 | 5/2003 | Barbier et al. | |
| 6,565,325 B2 | 5/2003 | Belehradek | |
| 6,588,458 B2 | 7/2003 | Rodgers | |
| 6,676,382 B2 | 1/2004 | Leighton et al. | |
| 6,703,930 B2 | 3/2004 | Skinner | |
| 6,813,946 B1 | 11/2004 | Benton | |
| 6,820,483 B1 | 11/2004 | Beckerman | |
| 6,989,649 B2 * | 1/2006 | Mehlhorn | 318/806 |
| 7,017,409 B2 | 3/2006 | Zielinski et al. | |
| 7,023,215 B2 | 4/2006 | Steenwyk | |
| 7,053,765 B1 | 5/2006 | Clark | |
| 7,093,485 B2 | 8/2006 | Newman et al. | |
| 7,165,450 B2 | 1/2007 | Jamnia et al. | |
| 7,183,741 B2 * | 2/2007 | Mehlhorn | 318/806 |
| 7,209,048 B1 | 4/2007 | Pace et al. | |
| 7,222,530 B2 | 5/2007 | Fukuhara et al. | |
| 7,230,528 B2 | 6/2007 | Kates | |
| 7,264,449 B1 | 9/2007 | Harned et al. | |
| 7,307,538 B2 | 12/2007 | Kochan, Jr. | |
| 7,309,216 B1 | 12/2007 | Spadola, Jr. et al. | |
| 7,319,853 B2 | 1/2008 | Luebke et al. | |
| 7,373,817 B2 | 5/2008 | Burdi et al. | |
| 7,398,682 B2 | 7/2008 | Magers | |
| 7,417,552 B1 | 8/2008 | Vaskovic | |
| 7,429,842 B2 | 9/2008 | Schulman et al. | |
| 7,458,782 B1 | 12/2008 | Spadola, Jr. et al. | |
| 7,509,856 B1 | 3/2009 | Winkens et al. | |
| 7,612,529 B2 | 11/2009 | Kochan, Jr. | |
| 7,746,243 B2 | 6/2010 | Chen et al. | |
| 7,755,318 B1 | 7/2010 | Panosh | |
| 7,814,787 B2 * | 10/2010 | Sabini et al. | 73/304 C |
| 7,972,117 B1 * | 7/2011 | MacDonald | 417/40 |
| 8,068,026 B1 | 11/2011 | Delerno et al. | |
| 2002/0072270 A1 | 6/2002 | Eckert et al. | |
| 2002/0076330 A1 * | 6/2002 | Lipscomb et al. | 417/36 |
| 2002/0076331 A1 | 6/2002 | Eckert et al. | |
| 2002/0102162 A1 | 8/2002 | Belehradek | |
| 2002/0157465 A1 * | 10/2002 | Marioni | 73/313 |
| 2002/0176782 A1 * | 11/2002 | Batchelder et al. | 417/36 |
| 2003/0019291 A1 | 1/2003 | Pchelnikov et al. | |
| 2003/0049134 A1 | 3/2003 | Leighton et al. | |
| 2003/0184444 A1 | 10/2003 | Collings | |
| 2004/0118433 A1 | 6/2004 | Bigott | |
| 2005/0076711 A1 | 4/2005 | Urquidi | |
| 2005/0099311 A1 * | 5/2005 | Eskins | 340/616 |
| 2005/0158177 A1 | 7/2005 | Mehlhorn | |
| 2006/0008355 A1 | 1/2006 | Low | |
| 2006/0078435 A1 | 4/2006 | Burza | |
| 2006/0219962 A1 * | 10/2006 | Dancs et al. | 250/577 |
| 2007/0258827 A1 | 11/2007 | Gierke | |
| 2007/0274839 A1 * | 11/2007 | Moskun | 417/36 |
| 2008/0031751 A1 | 2/2008 | Littwin et al. | |
| 2008/0031752 A1 | 2/2008 | Littwin et al. | |
| 2008/0197999 A1 | 8/2008 | Henderson | |
| 2008/0298978 A1 | 12/2008 | Schulman et al. | |
| 2009/0123295 A1 | 5/2009 | Abbott | |
| 2009/0148306 A1 | 6/2009 | Drechsel et al. | |
| 2009/0208345 A1 | 8/2009 | Moore et al. | |
| 2010/0180811 A1 | 7/2010 | Sotiriou | |
| 2011/0085919 A1 | 4/2011 | Williams et al. | |
| 2011/0110792 A1 | 5/2011 | Mauro et al. | |
| 2011/0110794 A1 | 5/2011 | Mayleben et al. | |
| 2011/0215919 A1 | 9/2011 | Hernandez | |
| 2011/0273288 A1 | 11/2011 | Kochan, Jr. et al. | |

FOREIGN PATENT DOCUMENTS

| | | |
|---|---|---|
| GB | 2064135 | 6/1981 |
| WO | 2004095388 | 11/2004 |
| WO | 2004104529 | 12/2004 |
| WO | WO 2006/0906075 * | 9/2006 |

* cited by examiner

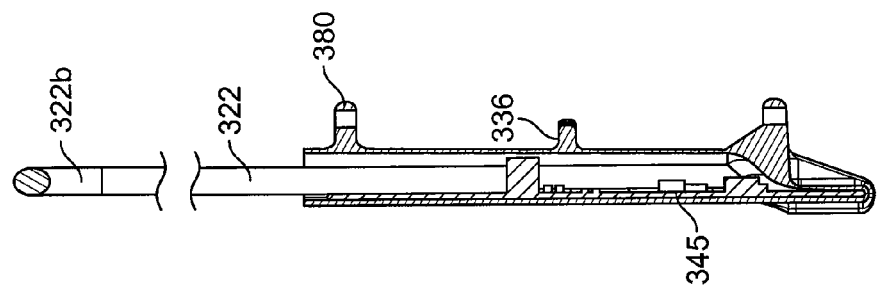
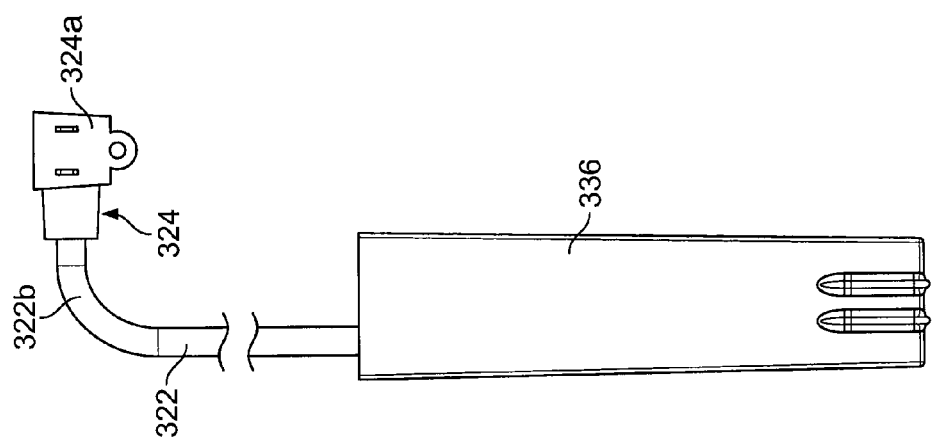
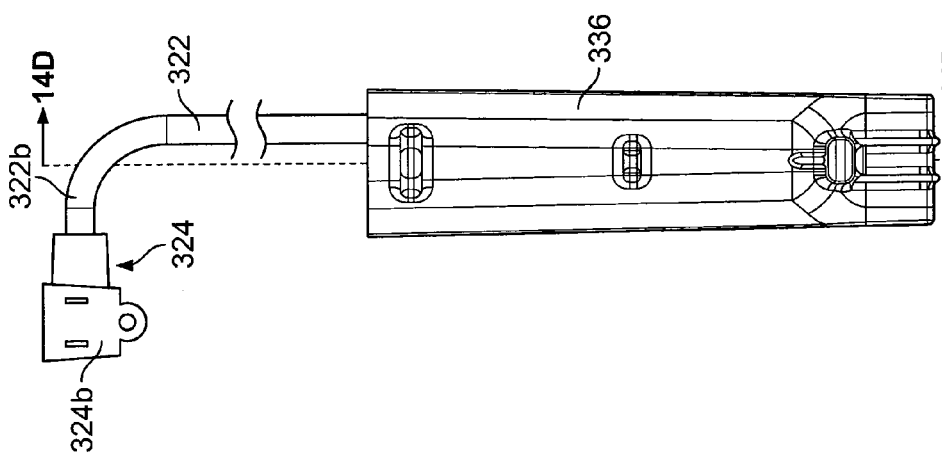

CAPACITIVE SENSOR AND METHOD AND APPARATUS FOR CONTROLLING A PUMP USING SAME

RELATED APPLICATION

This application claims benefit to U.S. Provisional Application No. 60/919,059 filed Mar. 19, 2007, which is incorporated herein by reference in its entirety.

FIELD OF THE INVENTION

The present invention relates to a capacitive sensor and, more particularly, to a method and apparatus for controlling a pump using same.

BACKGROUND OF THE INVENTION

Sensors are needed for a variety of applications. For example, pump applications, such as sump, dewatering, sewage, utility, effluent and grinder pumps, can use sensors to determine when the pump should be turned on and/or turned off. Conventional sump pumps generally include a pump having a mechanical switch connected to a float mechanism for controlling a liquid level in a reservoir. The float mechanism is disposed within the reservoir and adapted to travel on the surface of the liquid as the liquid rises and falls. Typical float mechanisms are mechanically connected to the switch and according to the position of the float relative to the pump, the switch controls power to the pump.

In one configuration, the mechanical connection between the switch and the float includes a flexible tether. As the float travels up or down on the surface of the liquid in the reservoir, the orientation of the flexible tether relative to the switch changes. Another typical form of a float mechanism includes one or more rods or interconnected linkages. Similar to the tether, the rods or linkages are configured to allow the float to travel freely with the rising or falling of the surface of the liquid in the reservoir. In either of these configurations, once the float reaches a predetermined upper limit, the tether, rod, or linkage transfers a mechanical force to flip the switch, thereby completing the circuit and activating the pump. Conversely, when the liquid level and the float reach a predetermined lower limit, the tether, rod, or linkage transfers a mechanical force to the switch in an opposite direction, thereby interrupting the circuit and deactivating the pump.

A shortcoming of the above-described sump pump float switch mechanisms is that they are inclined to experience mechanical failure. Sometimes mechanical failure occurs due to a deterioration of the mechanical connection between the float and the switch. Other times, the mechanical failure may occur due to objects in the reservoir that restrict or hinder the proper operation of the float mechanism.

A further known sump pump switching mechanism includes a resistance switching mechanism. Resistance switching mechanisms include a pair of electrodes exposed in the liquid in the reservoir. As the level of the liquid in the reservoir changes relative to the electrodes, the electrical resistance between the two electrodes changes. Based on the change in resistance between the two electrodes, a controller activates or deactivates the pump. A shortcoming of resistance type switch mechanisms is that the electrodes are exposed to the liquid and tend to be vulnerable to corrosion. Once corroded, the electrodes fail to generate accurate resistances that the controller expects and the controller fails to operate properly.

A still further known sump pump switching mechanism includes a capacitance switching mechanism. Capacitance switching mechanisms generally include a controller, an upper capacitor having two electrodes, and a lower capacitor having two electrodes. The upper and lower capacitors operate substantially independent of each other. When the level of the liquid reaches the upper capacitor, the controller detects a capacitance across both capacitors and activates the pump. The controller continues to activate the pump as the level of the liquid in the reservoir drops. Once the level of the liquid drops below the lower capacitor, the controller detects no capacitance across the lower capacitor and deactivates the pump. One shortcoming of such capacitance-based switching mechanisms is the reliance on multiple capacitors. Failure of one of the upper and lower capacitors may detrimentally affect the proper operation of the entire sump pump.

In other known sump pump applications, magnetic switching mechanisms, such as Hall Effect sensors or switches, are used to detect water levels and operate a pump. For example, in some applications, a float is used to raise a magnet to an upper magnetic sensor at which point the pump is turned on. When the water level drops the float descends down to a lower magnetic sensor at which point the pump is turned off. A shortcoming of such magnetic sensors is that they again require moving parts and are inclined to experience mechanical failure, such as that discussed above with respect to tethers.

Accordingly, it has been determined that a need exists for an improved sensor and method and apparatus for controlling a pump using same which overcome the aforementioned limitations and which further provide capabilities, features and functions, not available in current sensors and pumps.

SUMMARY OF THE INVENTION

In one form the present invention provides a variable capacitor having first and second electrodes and a dielectric connecting the first and second electrodes to form a capacitor having a readable capacitance. The dielectric includes a first part made of an insulative material and a second part made of a liquid that changes levels with respect to the insulative material which causes a change in the capacitance of the capacitor. Thus, the changing liquid level with respect to the insulative material provides a variable capacitor capable of producing a plurality of different capacitances.

In another form, the invention provides a capacitive sensor having a capacitor at least partially immersed in a liquid having a level that changes in relation to the capacitor, with the capacitor having a variable capacitance depending on the level of the liquid for providing a capacitance reading associated with the liquid level as mentioned above, and a circuit connected to the capacitor to determine the capacitance of the capacitor. Thus, the level of the liquid within which the capacitor is immersed may be determined based on the capacitance of the capacitor and the sensor may be used with a number of different pieces of equipment that are to be operated in response to changing liquid levels.

For example, one aspect of the present invention provides a pump controller for controlling the level of a liquid in a reservoir. The pump controller includes a controller and a capacitor. The capacitor is adapted to provide a first capacitance to the controller when the liquid in the reservoir reaches a first predetermined level relative thereto. Additionally, the capacitor is adapted to provide a second capacitance to the controller when the liquid in the reservoir reaches a second level relative thereto. Based on the second capacitance, the controller determines when to deactivate the pump.

One advantage of this form of the present invention is that it requires no moving parts that may suffer mechanical failure. The apparatus serves as a solid state sensor that detects liquid level to control activation and deactivation of the pump. Another advantage of this form of the present invention is that the capacitor may be wholly contained within the pump controller. Thus, the electrodes of the capacitor do not have to be exposed to the liquid in the reservoir and, therefore, would not be vulnerable to corrosion such as the electrodes in prior known resistance-based devices. A further advantage of this pump controller is that it includes a single capacitor in communication with the controller. This overall design reduces the number of electrical, mechanical, or electro-mechanical components that may suffer failure, makes it easier to assemble the sensor and can reduce cost associated with assembly and/or material costs for the apparatus.

In another form, the controller determines a run-time based on the second capacitance detected by the controller for which the pump should be activated to move a predetermined amount of the liquid out of the reservoir. For example, the controller may determine the flow rate of the liquid out of the reservoir based on the difference in capacitance readings from the time the pump was activated (e.g., the first capacitance reading) to the time the second capacitance reading was taken and calculate how much longer the pump needs to remain operating at that flow rate in order to lower the liquid level in the reservoir to a desired level.

In another form, the controller may be configured to deactivate the pump upon detecting the second capacitance from the capacitor. For example, the controller may be setup to regularly, or even continually, monitor the capacitance reading from the capacitor and shut off the pump once a predetermined capacitance value has been reached because the predetermined capacitance value is indicative of the fact the liquid level in the reservoir has dropped to a desired level. In one form, the apparatus includes a power source generating an alternating current and the controller is configured to detect the capacitance of the capacitor (or data associated with same) each time the alternating current is at a zero-crossing. In another form, the apparatus continually monitors the capacitance reading from the capacitor (or data associated with same).

BRIEF DESCRIPTION OF THE DRAWINGS

The invention will be explained in exemplary embodiments with reference to drawings, in which:

FIG. 14D is a cross-sectional view of the sensor of FIGS. 14A-C taken along line 14D-14D of FIG. 14B;

DETAILED DESCRIPTION OF THE PREFERRED EMBODIMENTS

Figure 1:
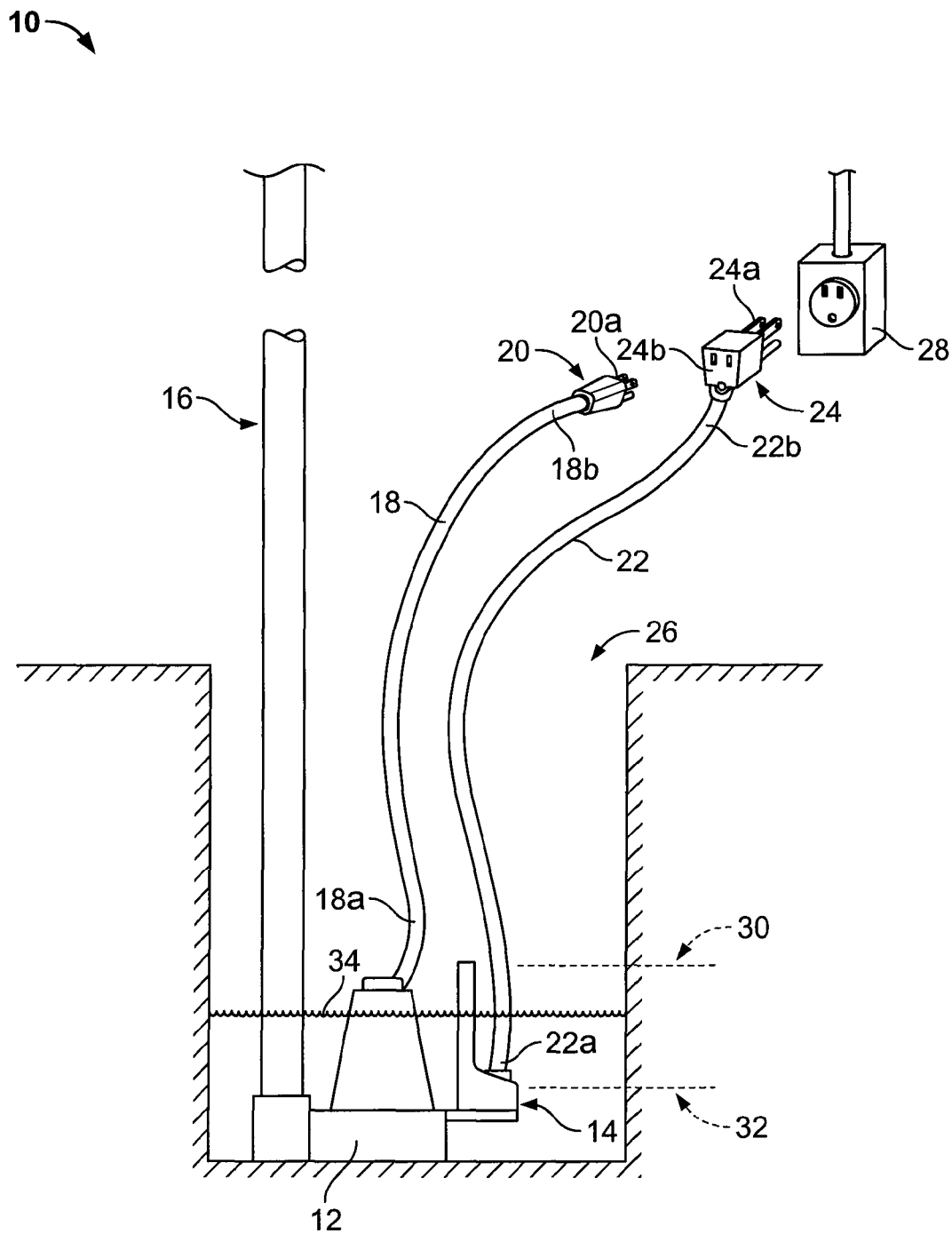
FIG. 1 is a side view of a first embodiment of a sump pump system disposed within a reservoir and incorporating a sensor unit in accordance with one form of the present invention.

FIG. 1 depicts a sump pump system 10 disposed within a reservoir 26. The sump pump system 10 includes a pump 12, a sensor or sensor unit 14, and a discharge pipe 16. In general, the sensor unit 14 monitors the level of a liquid 34 within the reservoir 26 and serves as a switch for activating and deactivating the pump 12 based on that level. When the level of the liquid 34 reaches a predetermined upper limit, which is identified by reference numeral 30 in FIG. 1, the sensor unit 14 activates the pump 12. Upon activation, the pump 12 begins moving the liquid 34 up and out of the reservoir 26 via the discharge pipe 16. This begins to lower the level of the liquid 34 in the reservoir 26. Once the level of the liquid 34 reaches a predetermined lower limit, which is identified by reference numeral 32 in FIG. 1, the sensor unit 14 deactivates the pump 12. The details of the sump pump system 10 will now be discussed in more detail with continued reference to the figures.

FIG. 1 depicts the sensor unit 14 including a power cord, such as piggy-back cord 22, having an originating end 22a fixed to the sensor unit 14 and a terminal end 22b connected to a plug 24. The piggy-back plug 24 has a standard three-prong male connector 24a and a standard three-point female receptacle 24b. The pump 12 includes a power cord 18 having an originating end 18a fixed to the pump 12 and a terminal end 18b connected to a plug 20. The plug 20 has a standard three-prong male connector 20a. Upon installation, the male connector 24a of the piggy-back plug 24 of the sensor unit 14 is disposed within a standard 115 VAC-230 VAC electrical outlet, which is identified by reference numeral 28 in FIG. 1. Additionally, the male connector 20a of the plug 20 of the pump 12 is disposed within the female receptacle 24b of the piggy-back plug 24 of the sensor unit 14. Thus, the electrical outlet 28, the sensor unit 14, and the pump 12 are electrically connected in series with one another. So configured, electrical current provided by the electrical outlet 28 will only power the pump 12 when the sensor unit 14 operates as a closed switch, completing the circuit and enabling current to pass therethrough. Additionally, this configuration enables the sensor unit 14 and the pump 12 to be constructed independent of each other. An advantage of this independence is that the pump 12 and/or the sensor unit 14 may be replaced or purchased independently of the other. Meaning, the sensor unit 14 could be adapted to operate with nearly any available pump so long as the plugs are interconnectable.

Figure 2:
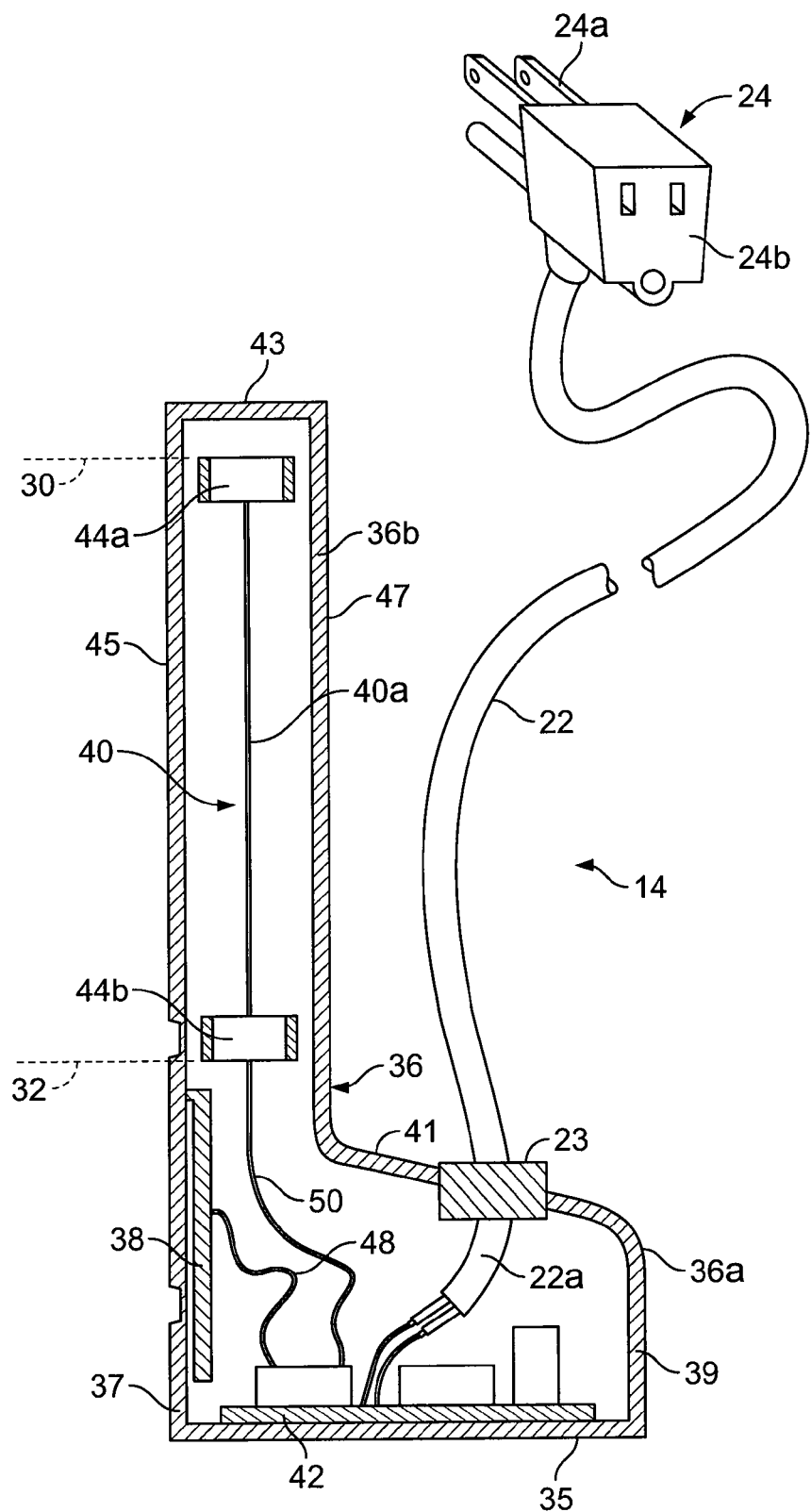
FIG. 2 is a side cross-sectional view of the sensor unit of the first embodiment of the sensor unit depicted in FIG. 1.

FIG. 2 depicts a more detailed view of the sensor unit 14 of the sump pump system 10 depicted in FIG. 1. As stated above, the sensor unit 14 includes a power cord 22 terminating in a piggy-back plug 24. Additionally, as depicted in FIG. 2, the sensor unit 14 includes a housing 36, a reference electrode 38, a detection electrode 40, and a circuit board 42. In the form illustrated, the housing 36 is a hollow, generally L-shaped box including a base portion 36a and an upper portion 36b extending generally perpendicularly from the base portion 36a. The base portion 36a is box-shaped and has a generally square side cross-section defined by a bottom wall 35, a first side wall 37, a second side wall 39, and a top wall 41. Additionally, the base portion 36a includes an opening in the top wall 41 receiving the originating end 22a of the power cord 22, which is electrically connected to the circuit located on circuit board 42, and preferably a strain relief 23. The upper portion 36b of the housing 36 is also box-shaped and has a generally elongated rectangular side cross-section defined by a top wall 43, a first side wall 45, and a second side wall 47.

The detection electrode 40 is disposed wholly within the upper portion 36b of the housing 36 and is situated directly above the reference electrode 38. A lower portion of the reference electrode 38 is disposed within the base portion 36a of the housing 36 and an upper portion of the reference electrode 38 is disposed within the upper portion 36b of the housing 36. The reference and detection electrodes 38, 40 each include a conductor, such as a metal plate. More specifically, in the embodiment illustrated, the detection electrode 40 includes a thin metal plate 40a having upper and lower biased portions 44a, 44b. In the form illustrated, the upper and lower biased portions 44a, 44b include metallic foil rings. The foil rings 44a, 44b enable the detection electrode 40 to provide a non-linear output across its length. For example, capacitance generated between the electrodes 38, 40 is larger when the level of the liquid 34 in the reservoir 26 is near one of the foil rings 44a, 44b than when it is near the center of the detection electrode 40. Additionally, the reference and detection electrodes 38, 40 are electrically connected to the circuit on the circuit board 40 with wires 48 and 50, respectively.

Figure 3:
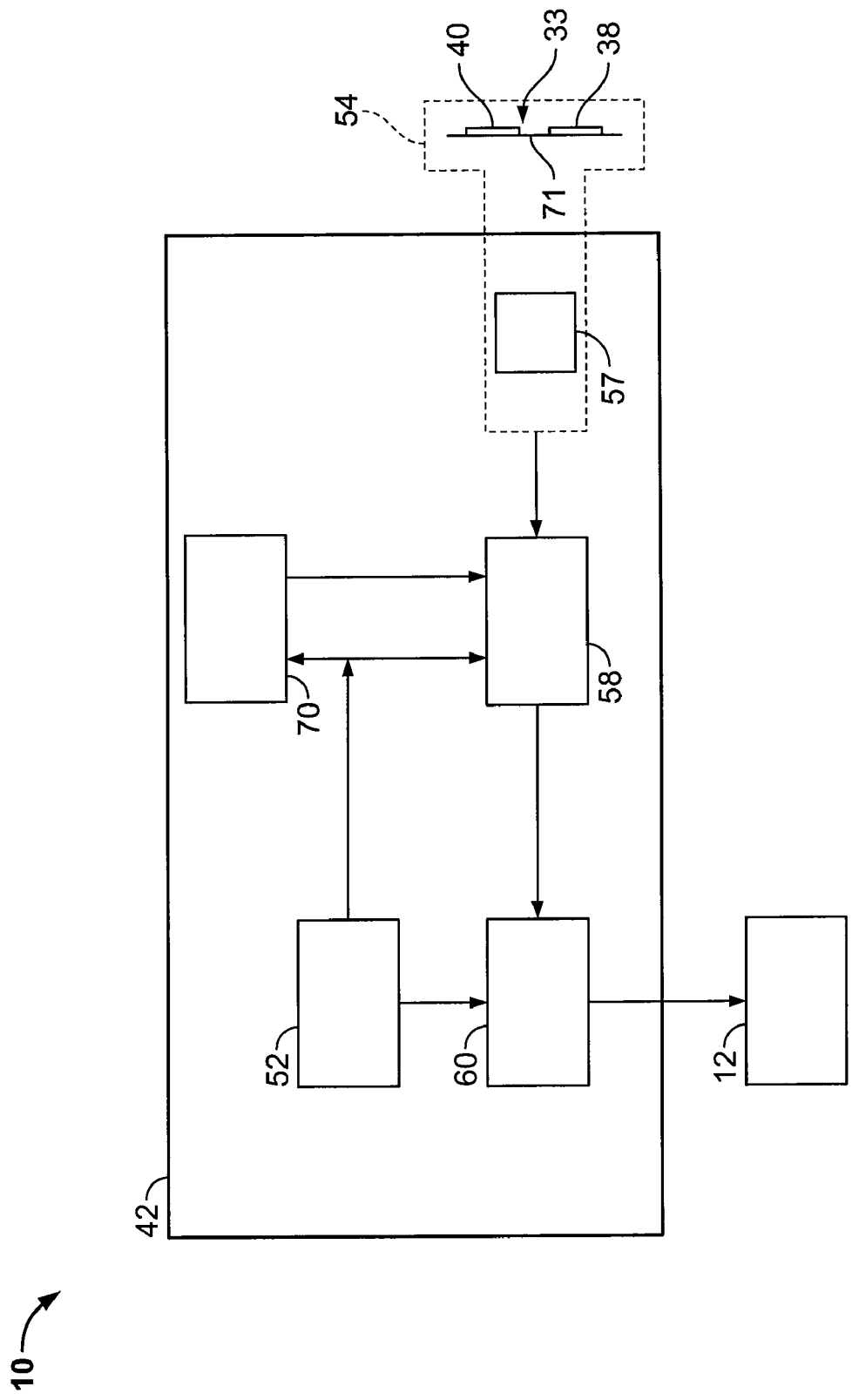
FIG. 3 is a block diagram of the pump control of FIG. 1.

With reference to the block diagram provided in FIG. 3, the sump pump system 10 and, more particularly, the circuit board 42 includes a power supply 52, a capacitive sensor 54, a controller, such as microprocessor 58, an AC switch, such as solid state relay (SSR) 60, and signaling circuitry 70. The microprocessor 58 detects capacitance from the capacitive sensor 54 upon receipt of a signal delivered by the signaling circuitry 70, as will be described in more detail below. The microprocessor 58 then activates the pump 12 via the SSR 60 when the capacitance detected by the capacitive sensor 54 indicates that the liquid 34 in the reservoir 26 has reached the predetermined upper limit 30, as identified in FIGS. 1 and 2.

Figure 4A:
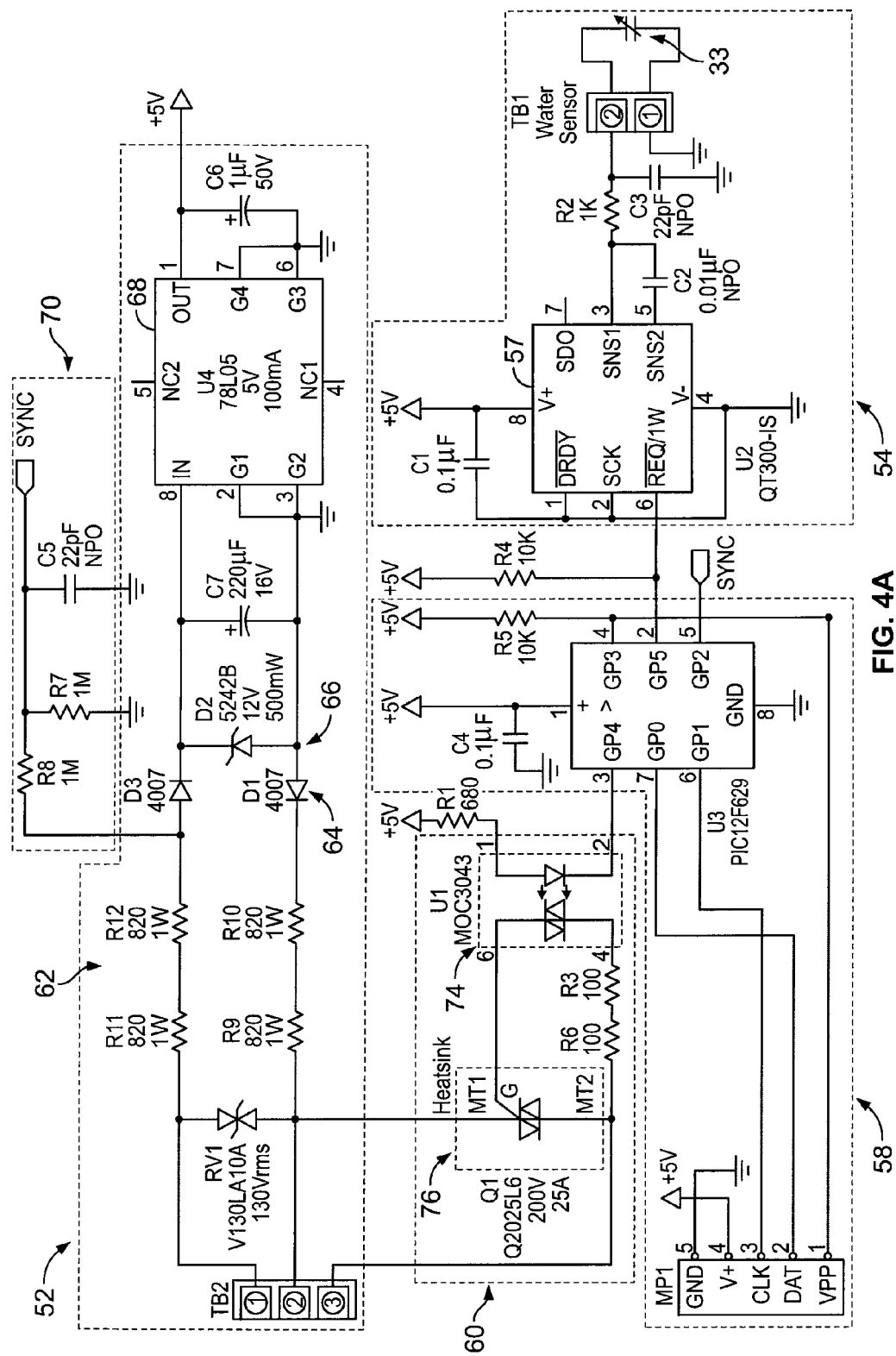
FIG. 4A is a detailed schematic diagram of a pump control circuit using the sensor unit depicted in FIGS. 1-3.
Figure 4B:
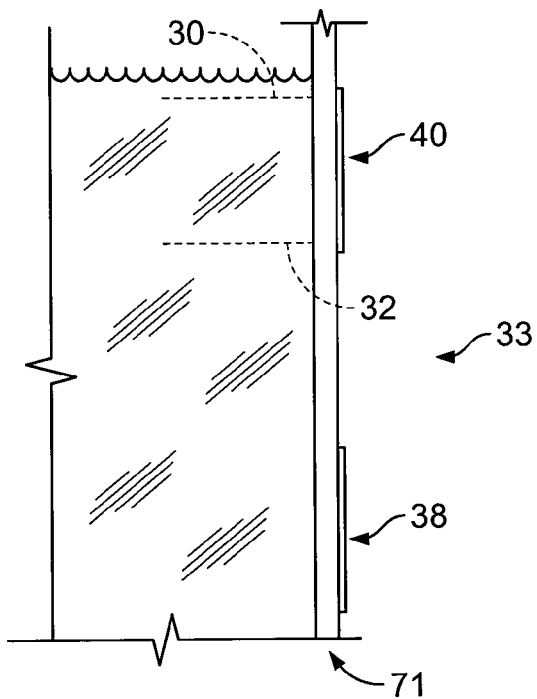
FIG. 4B is an enlarged schematic cross-sectional view of a the capacitor of the control circuit of FIG. 4A.

Referring now to FIGS. 3 and 4A-B, the pump control circuit on circuit board 42 will be described in more detail. In the form illustrated, the pump control includes a power supply 52, a capacitive sensor 54, including a capacitor 33 and a capacitive sensing integrated circuit (IC) 57, a controller 58 and an AC switch 60 for actuating the pump (not shown). The power supply 52 includes an AC power source or input (e.g., 115-230 VAC) (not shown), a voltage divider 62, a rectifier 64, a zener diode 66, a capacitor C7, and a voltage regulator 68. The voltage divider 62 includes a plurality of resistors R9, R10, R11 and R68 and the rectifier 64 includes two diodes D1 and D3. Together, the voltage divider 62, the rectifier 64 and the zener diode 66 step the AC voltage down to a rough or pulsating DC voltage, which in turn is filtered or smoothed out by the capacitor C7 and the voltage regulator 68 to generate a 5 VDC output. This 5 VDC output is supplied to various components of the circuit including, among other items, the capacitive sensor 54 and the microprocessor 58.

The signaling circuitry 70 comprises a line brought off of the AC input to the microprocessor (pin 5) through a current limiting resistor R8 to tell the processor when the input voltage signal is low enough to back bias the rectifier diodes. This tells the microprocessor to take a measurement reading from the capacitive sensor IC when there is a high impedance between the power line and reading circuitry, which minimizes the effects of stray capacitance tied to the two sensor plates 38 and 40 isolated by the dielectric layer 71. Thus, when the signaling circuitry 70 monitors the voltage from the power supply 52 and informs the microprocessor 58 when a zero-crossing of the voltage input signal occurs, the input voltage signal is low enough to back bias the diodes D1 and D3 of the rectifier 64 so that the microprocessor 58 can take an accurate reading from the capacitor 33.

The capacitor 33 includes the reference electrode 38, the detection electrode 40, a dielectric wall 71, and a capacitive sensing integrated circuit (IC), such as capacitance-to-digital converter 57, which is connected to the capacitor 33 so that the controller 58 can read and process the capacitance of capacitor 33 at the zero-crossings of the AC supply. It should be understood, however, that in alternate embodiments, a controller may be selected which can read and process data directly from the capacitor 33, if desired.

With reference to FIG. 4A, the dielectric wall 70 includes the first side wall 45 of the housing 36 of the sensor unit 14, as described above with reference to FIG. 2. The dielectric wall 70 serves to isolate the reference and detection electrodes 38, 40 from the liquid 34 in the reservoir 26, thereby creating capacitor 33. In a preferred form, the electrodes 38, 40 are positioned flush against the dielectric as illustrated in FIG. 4B so as to avoid air gaps between the dielectric and the electrodes 38, 40. In this form, the electrodes may be attached to the dielectric with epoxy so no air gaps will exist between the capacitor electrodes and the dielectric, which would otherwise negatively affect the performance of the capacitive sensor. In another form, the electrodes 38, 40 are encased in the insulative material of the dielectric, which also would eliminate air gaps between the electrodes and the dielectric. The reference electrode 38 is electrically connected to circuit ground and the detection electrode 40 is electrically connected to the capacitive sensing IC 57, as depicted schematically in FIG. 4A. The level of the liquid 34 in the reservoir 26 alters the performance of the side wall 45 and ultimately the value of capacitance generated by the capacitor 33. Thus, in this way, the dielectric is made up in part by the side wall 45 and in part by the liquid 34 so that the capacitance of capacitor 33 varies in relation to the liquid level of liquid 34.

In the form illustrated in FIG. 2, the side wall 45 is made of a polymer, such as plastic, and the housing 36 is filled with a protective material, such as a potting compound, to protect the capacitor 33 and other electronic circuit components from exposure to the liquid within which the capacitor 33 is immersed. The housing is first partially filled with the potting compound before the circuit board is inserted. Then, after the circuit board is inserted, the housing is filled with additional potting compound to fully protect the circuit components. The potting compound used to fill the housing after the circuit board is inserted may be the same potting compound as the first, or it may be of a different composition. For example, a second, different potting compound may be used for certain applications, such as sewage applications, where external conditions dictate the use of different materials. A small piece of foam may be used to hold the circuit board against the inside wall of the housing while the potting compound cures. This method has also been found effective to keep air from being trapped between the electrodes 38, 40 and the dielectric. However, as mentioned above, in a preferred form the electrodes 38, 40 are either epoxied to the dielectric wall 45 or encased in the dielectric wall to eliminate air gaps. In this form, the capacitance generated by the reference and detection electrodes 38, 40 varies from approximately 1 picofarad (pF) with the level of the liquid 34 in the reservoir 26 being located at the predetermined lower limit 32 of the detection electrode 40 to approximately 11 pF at the predetermined upper limit 30 of the detection electrode 40. As will be discussed more thoroughly below, the microprocessor 58 reads the capacitance generated by the reference and detection electrodes 38, 40 from the capacitive sensing IC 57. When the capacitance indicates that the level of the liquid 34 has reached the predetermined upper limit 30, the microprocessor 58 actuates the AC switch or SSR 60, which activates the pump 12.

The SSR 60 includes an opto-triac 74 and an AC solid state switch, such as a triac 76, or an alternistor. The switch 76 is electrically connected between the AC power supply 52 and the pump 12, and the opto-triac 74 is electrically connected between switch 76 and the microprocessor 58. The opto-triac 74 provides a zero voltage switch for triggering the switch 76 and, in the form illustrated, the switch 76 performs substantially the same function as two thyristors such as silicon controlled rectifiers (SCRs) wired in inverse parallel (or back-to-back). Thus, the opto-triac 74 drives the switch 76 and isolates or protects the microprocessor 58 and the other digital circuitry from the non-rectified AC signal that passes through the switch 76 when the pump 12 is activated. Additionally, the switch 76 allows both the positive and negative portions of the AC signal to be passed through to operate the pump 12.

Figure 5:
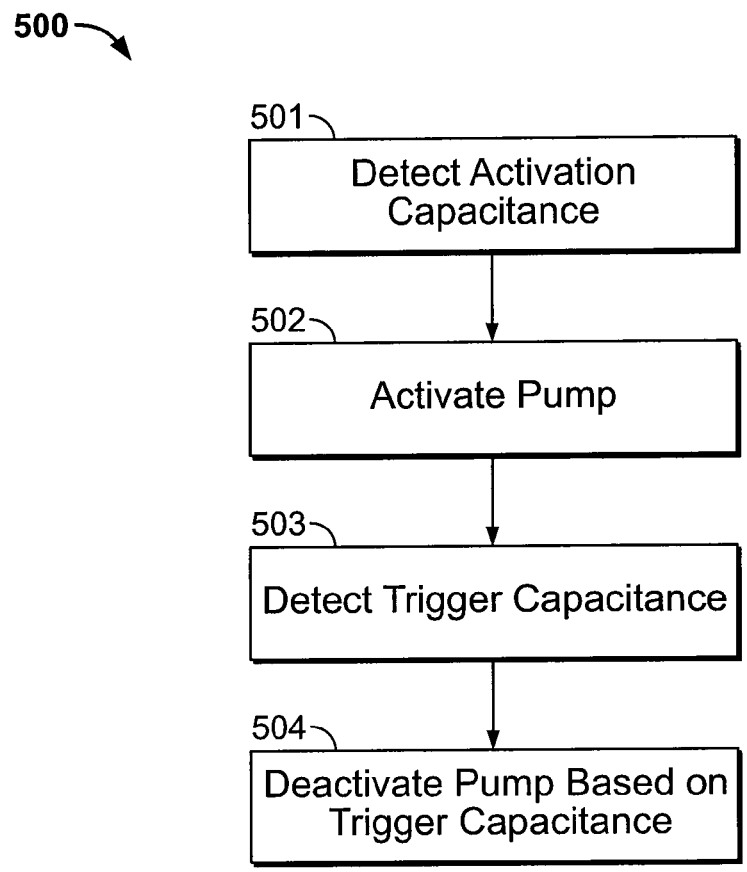
FIG. 5 is a flowchart of a general operation process of the sensor unit depicted in FIGS. 1-3.

FIG. 5 depicts a flowchart of a general operational process performed by the microprocessor 58 of the sump pump system 10. First, when the level of the liquid 34 in the reservoir 26 reaches the predetermined upper limit 30, the microprocessor 58 detects the existence of an activation capacitance (e.g., equal to or above a predetermined capacitance) from the capacitor 33 of the sensor unit 14 at block 501. The microprocessor 58 then activates the pump 12 at block 502 to begin moving the liquid 34 out of the reservoir 26. Meanwhile, the microprocessor 58 continues detecting the capacitance generated by capacitor 33. Once the level of the liquid in the reservoir 26 falls to the lower limit 32 shown in FIGS. 1 and 2, the microprocessor 58 will detect the existence of a sample or trigger capacitance (which may be equal to or below a predetermined capacitance or alternatively a random capacitance) from the capacitor 33 at block 503, resulting in the microprocessor 58 deactivating the pump 12 at block 504. For example, in one form, the trigger capacitance is a predetermined value of capacitance and the microprocessor 58 simply deactivates the pump 12 when the trigger capacitance was detected. In another form, however, the trigger capacitance is either a predetermined capacitance value or a random capacitance value that simply allows the microprocessor 58 to calculate the flow rate of the liquid 34 evacuating the reservoir 26 so that the microprocessor 58 can determine how long the pump 12 should remain operating. This process will be discussed in greater detail below with reference to the various embodiments described with reference to FIGS. 6 and 7.

Figure 6:
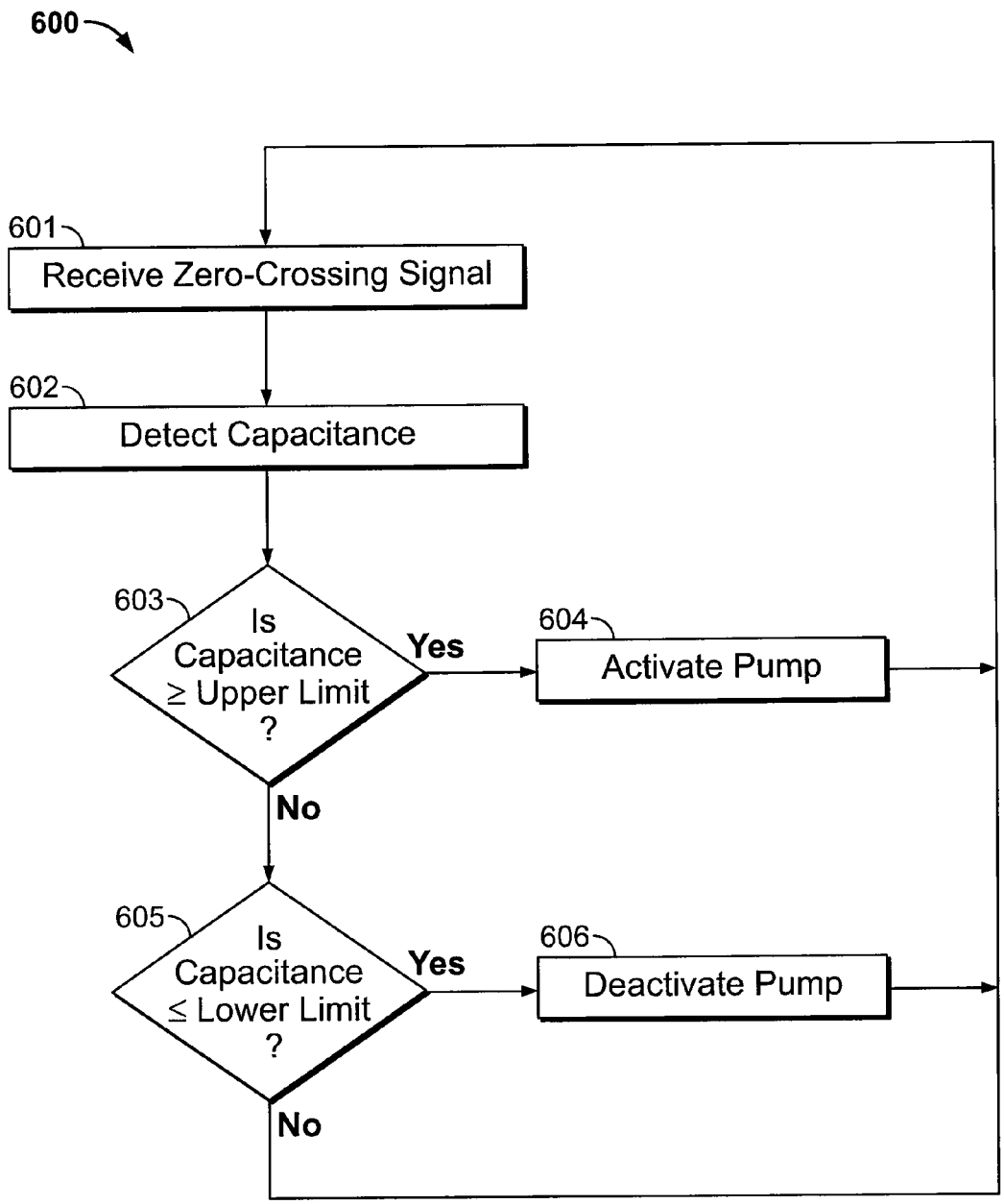
FIG. 6 is a flowchart of a process of controlling a level of a liquid in a reservoir in accordance with one form of the present invention.

FIG. 6 depicts a detailed flowchart of a process 600 performed by the microprocessor 58 for activating and deactivating the pump 12 according to the present invention. The process 600 controls the level of the liquid 34 in the reservoir 26 by utilizing a sump pump system 10 such as that described above. First, the microprocessor 58 receives a zero-crossing signal from the signaling circuitry 70 at block 601. Substantially immediately thereafter, the microprocessor 58 detects a capacitance generated by the capacitor 33 at block 602. Specifically, in the form of the sump pump system 10 discussed above, the capacitance is generated between the reference and detection electrodes 38, 40 of the capacitor 33 and detected and translated to digital data by the capacitance-to-DC converter 57 so that the microprocessor 58 can process the digital data and determine whether to activate or deactivate the pump 12.

After the microprocessor 58 detects the capacitance, it determines whether the detected capacitance is equal to a predetermined upper limit capacitance at block 603. The predetermined upper limit capacitance corresponds to a capacitance generated by the electrodes 38, 40 when the level of the liquid 34 in the reservoir 26 is at the predetermined upper limit 30 shown in FIGS. 1 and 2. In the event the detected capacitance is equal to the upper limit capacitance, the microprocessor 58 activates the pump 12 at block 604 to move the liquid 34 out of the reservoir 26 via the discharge pipe 16. Specifically, in the form of the sump pump system 10 discussed above, the microprocessor 58 triggers or turns on the opto-triac 74 and the opto-triac 74 triggers or turns on the switch 76. This closes the circuit between the AC power supply and the pump 12 allowing the alternating current to travel directly to the pump 12 to operate the pump 12. Once the microprocessor 58 activates the pump 12, it waits to receive another zero-crossing signal from the signaling circuitry 70 at block 601 and repeats the process 600 accordingly.

Alternatively, if the microprocessor 58 determines at block 603 that the capacitance detected at block 602 is not equal to the predetermined upper limit capacitance, the microprocessor 58 determines whether the detected capacitance is less than or equal to a trigger capacitance at block 605. In this form of the process 600, the trigger capacitance is equal to a predetermined lower limit capacitance, which corresponds to a capacitance generated by the electrodes 38, 40 when the level of the liquid in the reservoir 26 is at the predetermined lower limit 32 shown in FIGS. 1 and 2. If the detected capacitance is greater than the lower limit capacitance, the microprocessor 58 returns to receiving zero-crossing signals from the signaling circuitry 70 at block 601. Alternatively, however, if the detected capacitance is less than or equal to the lower limit capacitance, the microprocessor 58 deactivates the pump 12 at block 606 and then returns to receiving zero-crossing signals from the signaling circuitry 70 at block 601. The process 600 thereafter repeats itself.

Figure 7:
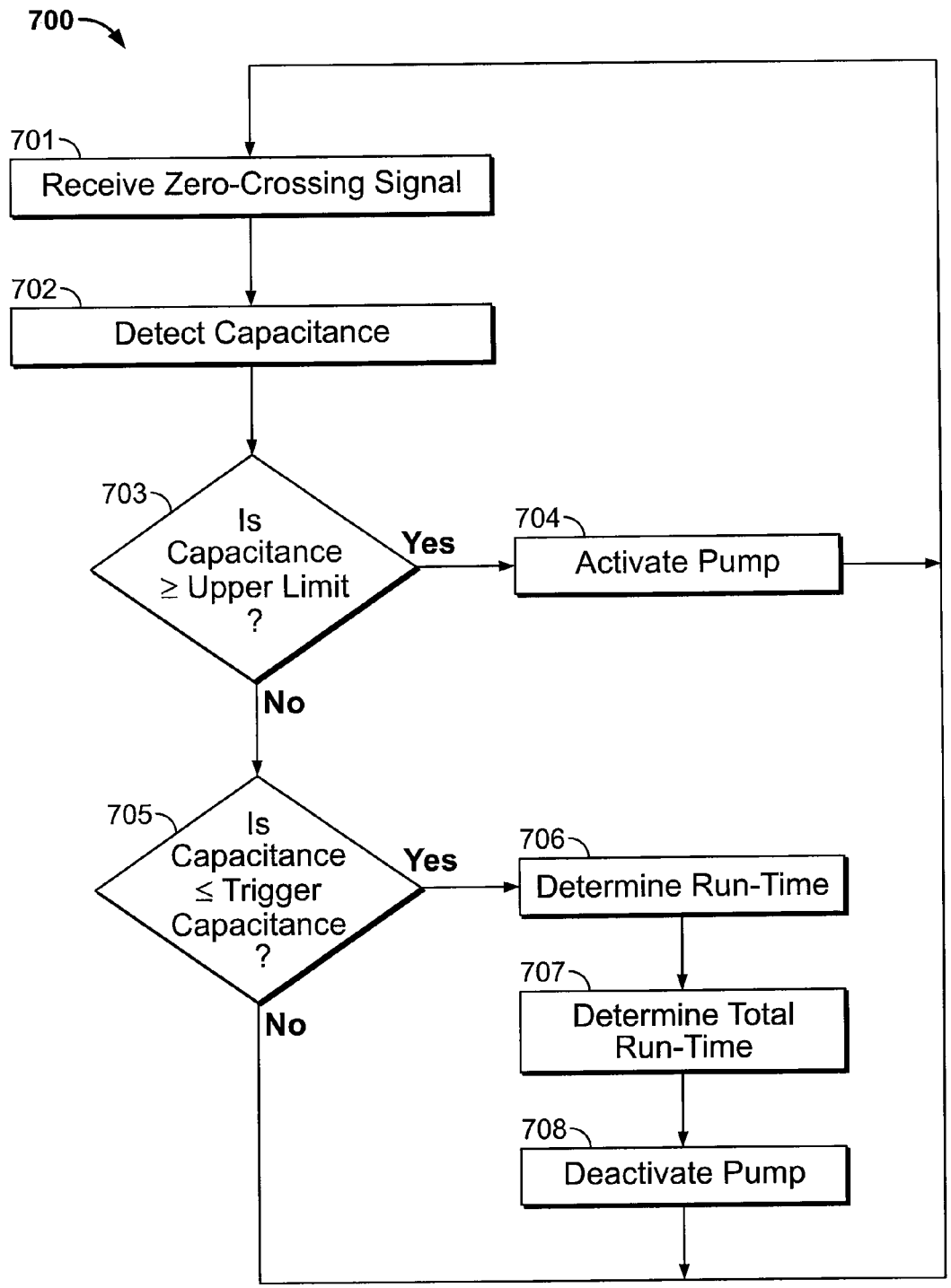
FIG. 7 is a flowchart of a process of controlling a level of a liquid in a reservoir in accordance with another form of the present invention.

FIG. 7 depicts a detailed flowchart of an alternative process 700 performed by the microprocessor 58 for activating and deactivating the pump 12. The process 700 controls the level of the liquid 34 in the reservoir 26 utilizing a sump pump system 10 such as that described above. First, the microprocessor 58 receives a zero-crossing signal from the signaling circuitry 70 at block 701. Substantially immediately thereafter, the microprocessor 58 detects a capacitance generated by the capacitor 54 at block 702. Specifically, in the form of the sump pump system 10 discussed above, the capacitance is generated between the reference and detection electrodes 38, 40 and stored by the capacitance sensing IC 57. Therefore, the microprocessor 58 detects or reads the capacitance from the IC 57.

After the microprocessor 58 detects the capacitance, it determines whether the detected capacitance is equal to a predetermined upper limit capacitance at block 703. The predetermined upper limit capacitance corresponds to a capacitance generated by the electrodes 38, 40 when the level of the liquid 34 in the reservoir 26 is at the predetermined upper limit 30 shown in FIGS. 1 and 2. In the event the detected capacitance is equal to the upper limit capacitance, the microprocessor 58 activates the pump 12 at block 704 to move the liquid 34 out of the reservoir 26 via the discharge pipe 16. Specifically, in the form of the sump pump system 10 discussed above, the microprocessor 58 triggers or turns on the opto-triac 74 and the opto-triac 74 triggers or turns on the switch 76. This completes the circuit between the AC power supply and the pump 12 and allows the alternating current provided by the power supply to operate the pump 12. Once the microprocessor 58 activates the pump 12, it waits to receive another zero-crossing signal from the signaling circuitry 70 at block 701 and proceeds accordingly.

Alternatively, if the microprocessor 58 determines at block 703 that the capacitance detected at block 702 is not equal to the predetermined upper limit capacitance, the microprocessor 58 determines whether the detected capacitance is less than or equal to a predetermined trigger capacitance at block 705. The predetermined trigger capacitance is equal to a capacitance generated by the reference and detection electrodes 38, 40 when a surface of the liquid in the reservoir 26 is at a predetermined location below the upper limit 30 illustrated in FIGS. 1 and 2, but above the lower limit 32 illustrated in FIGS. 1 and 2. In one embodiment of the present invention, the trigger capacitance is measured when the surface of the liquid 34 in the reservoir 26 is approximately 1 inch below the upper limit 30. However, such trigger capacitance may be measured at virtually any location along the detection electrode 40 that is below the upper limit 30 and above the lower limit 32.

Nevertheless, if the microprocessor 58 determines at block 705 that the detected capacitance is not less than or equal to the trigger capacitance, the microprocessor returns to receiving zero-crossing signals from the signaling circuitry 70 at block 701. Alternatively, however, if the microprocessor 58 determines at block 705 that the detected capacitance is less than or equal to the trigger capacitance, it calculates a run-time at block 706.

The run-time is the amount of time that it took to pump down the liquid 34 in the reservoir 26 from the upper limit 30 to the predetermined location between the upper and lower limits 30, 32. The microprocessor 58 determines this run-time by monitoring the time that passed between when the microprocessor 58 determined the capacitance to be equal to the predetermined upper limit capacitance and when the microprocessor determined the capacitance to be equal to the trigger capacitance. In one form of the process 700, this determination may be made by using an internal clock in the microprocessor 58 to determine how much time has lapsed between the start of the pump and/or detection of the predetermined upper limit capacitance and detection of the trigger capacitance. However, it should be appreciated that the microprocessor 58 may determine this run-time in any effective manner which allows the microprocessor 58 to calculate the flow rate of the liquid 34 being moved out of the reservoir 26.

After determining the run-time at block 706, the microprocessor 58 calculates a total run-time at block 707. The total run-time is a factor of the run-time and corresponds to how long the pump 12 should remain activated to lower the level of the liquid 34 in the reservoir 26 to the predetermined lower limit 32 or some other desired level. In one form, the total run-time determined at block 707 is five times the run-time determined at block 706. Therefore, after the total run-time passes, the microprocessor 58 deactivates the pump 12 at block 708 and returns to receiving subsequent zero-crossing signals from the signaling circuitry 70 at block 701 and the process repeats itself accordingly.

While the above-described process 700 has been described as including a determination of a run-time and a total run-time, an alternate form of the process may include a determination of a flow rate at which the level of the liquid 34 drops between the microprocessor 58 detecting the upper limit capacitance and the trigger capacitance. In such a case, the microprocessor 58 would deactivate the pump 12 only after the pump 12 has removed a predetermined volume of liquid 34 out of the reservoir 26.

Additionally, it should be appreciated that while the above-described processes 600 and 700 have been described as including a series of actions described according to a sequence of blocks or steps, the present invention is not intended to be limited to any specific order or occurrence of those actions. Specifically, the present invention is intended to include variations in the sequences at which the above-described actions are performed, as well as additional or supplemental actions that have not been explicitly described, but could otherwise be successfully implemented.

Furthermore, in a preferred embodiment of the processes 600, 700 described above, the microprocessor 58 is programmed to activate the pump 12 for a minimum of four seconds and a maximum of sixteen seconds. Additionally, the microprocessor 58 is programmed to insure deactivation of the pump 12 for a minimum of one second between activation and deactivation. It should be appreciated, however, that such specific activation and deactivation periods are merely exemplary and that the microprocessor 58 may be programmed to accommodate various different sizes, models and configurations of pumps 12 and, therefore, these timings may also be changed to satisfy the desired conditions for any given application.

Figure 8:
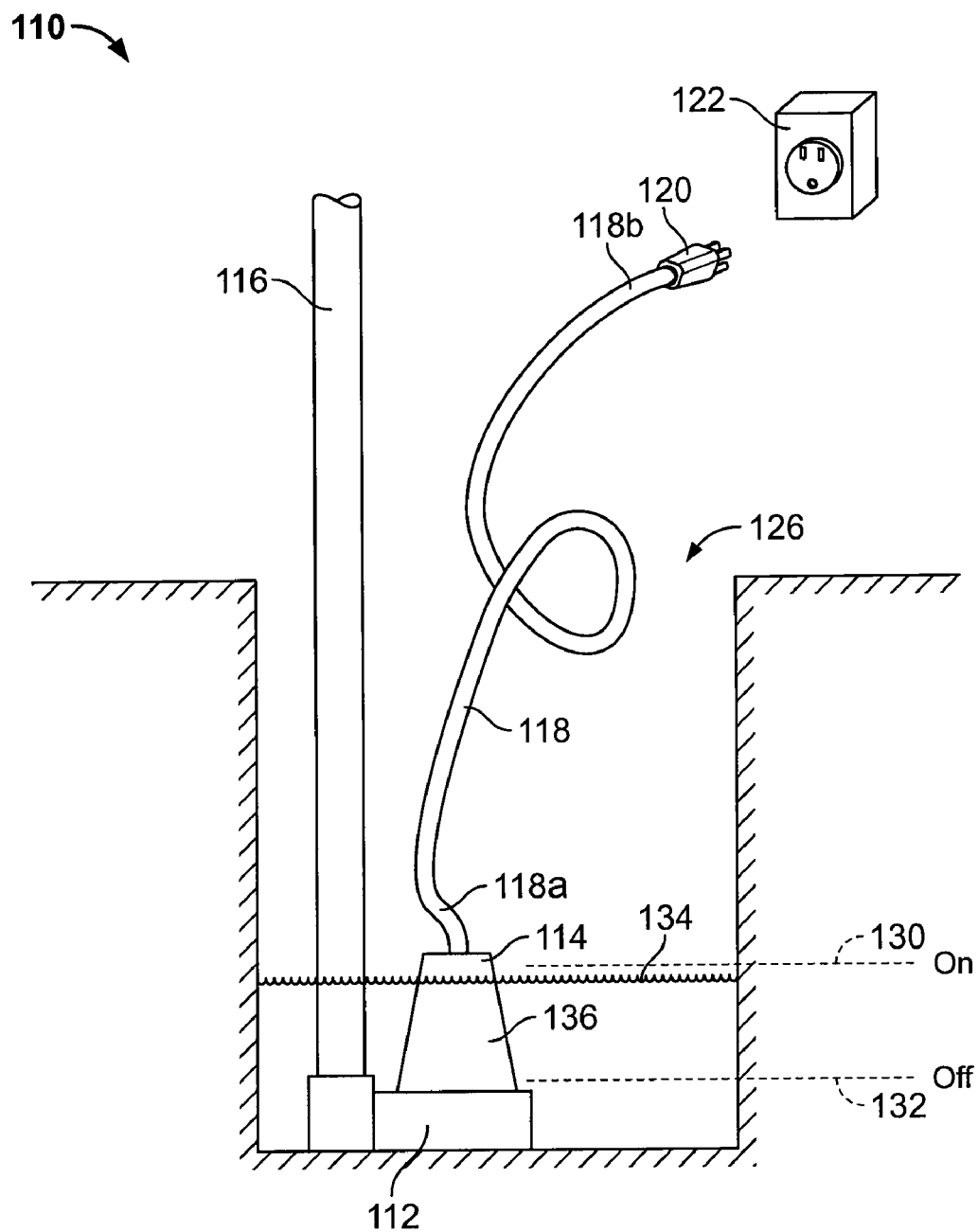
FIG. 8 is a side view of an alternate embodiment of a sump pump disposed within a reservoir and incorporating an integrated sensor unit according to the principles of the present invention.
Figure 9:
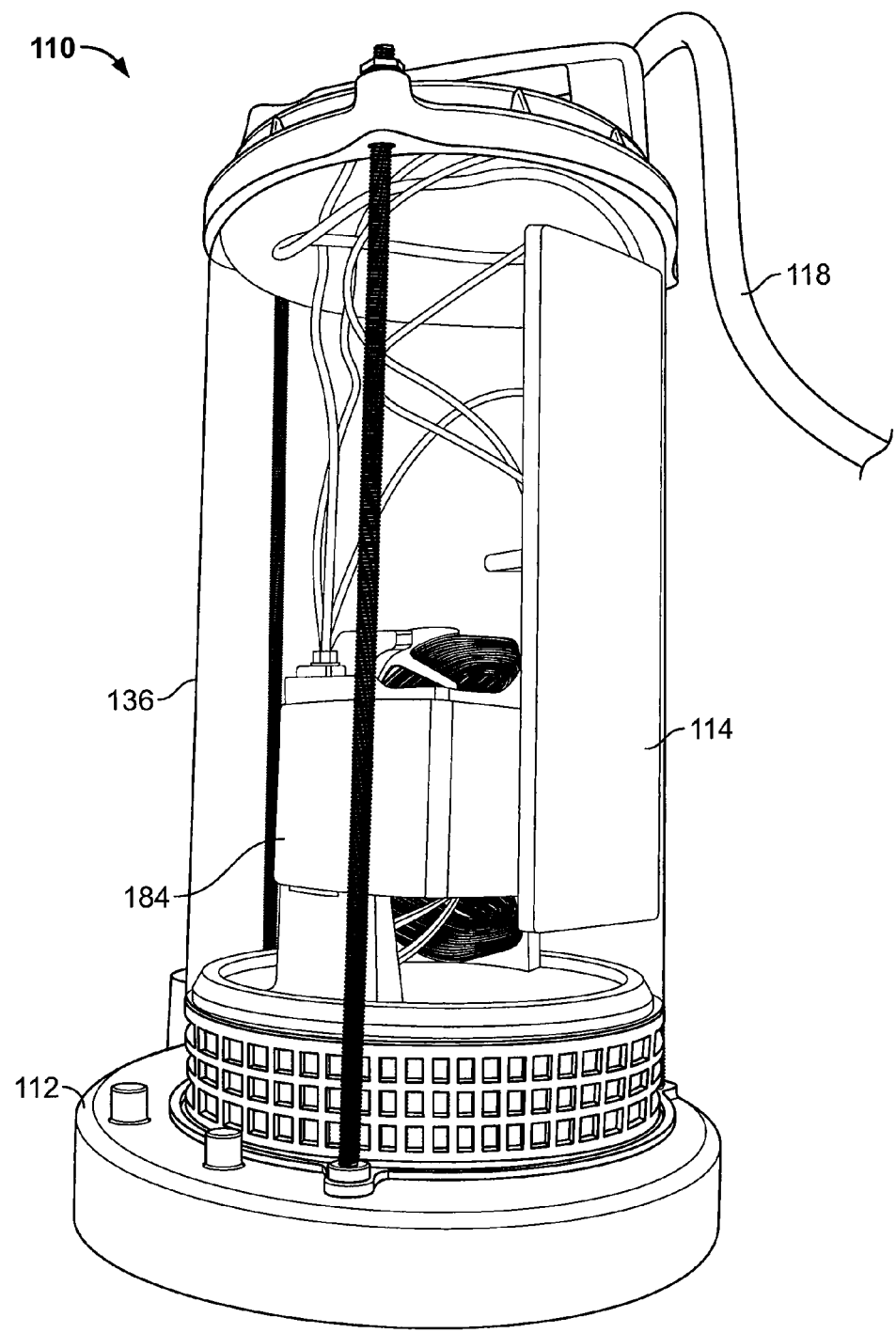
FIG. 9 is a perspective view of an alternate embodiment of a sump pump incorporating an integrated sensor unit in accordance with the present invention, with a portion of the outer housing shown in transparent to illustrate the internal components therein.

Referring now to FIGS. 8 and 9, alternative embodiments of systems are shown using a sensor in accordance with the invention. For convenience, features of the alternate embodiments illustrated in FIGS. 8-9 that correspond to features already discussed with respect to the embodiment of FIGS. 1-7 are identified using the same reference numerals in combination with the prefix "1" merely to distinguish one embodiment from the other, but otherwise such features are similar. In this form, sump pump system 110 includes a pump 112 powered by a motor 184, a sensor unit 114, and a liquid discharge pipe 116. Unlike the sump pump system 10 described above, the pump 112 and the sensor unit 114 are an integral unit sharing a common power cord 118. The power cord 118 includes an originating end 118a fixed to the sensor unit 114 and a terminal end 118b connected to a plug 120. The plug 120 is adapted to be electrically connected to a standard electrical outlet 122, similar to that described above with reference to the first embodiment of the sump pump system 10. Therefore, while the electrical connection between the sensor unit 14 and the pump 12 described in accordance with the first embodiment of the sump pump system 10 was achieved externally via the different cords, the same electrical connection is made in the sump pump system 110 of this alternative embodiment internally. Specifically, the sensor unit 114 and the pump 112 are hard-wired together and constructed as a single operational unit. Otherwise all features, characteristics and functions are generally the same as described above regarding the first embodiment and will not be described in detail again.

In the form illustrated, the capacitor is disposed in the housing 136 of the pump 112 and uses an outer wall of the housing 136 as part of the dielectric and the liquid level of liquid 134 with respect to the housing 136 to affect the dielectric performance and capacitance of the variable capacitor of capacitive sensor 114. Thus, when the liquid level of liquid 134 raises or lowers with respect to housing 136, a corresponding change in capacitance will be detected by sensor 114. When the detected capacitance is equal to or greater than the capacitance associated with the predetermined upper limit 130, the pump will be activated to evacuate liquid out of the reservoir 126 until the liquid 134 has dropped below a desired lower limit 132.

Figure 10:
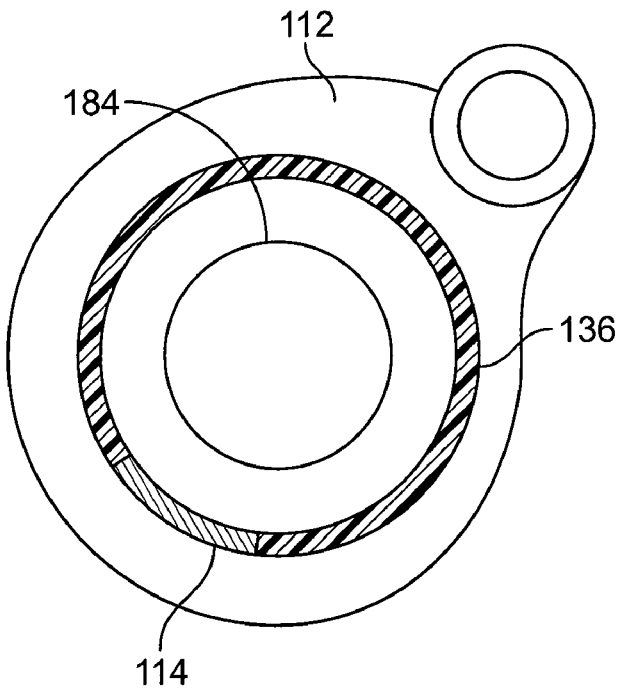
FIG. 10 is a top cross-sectional view of the embodiment of FIG. 9.
Figure 11:
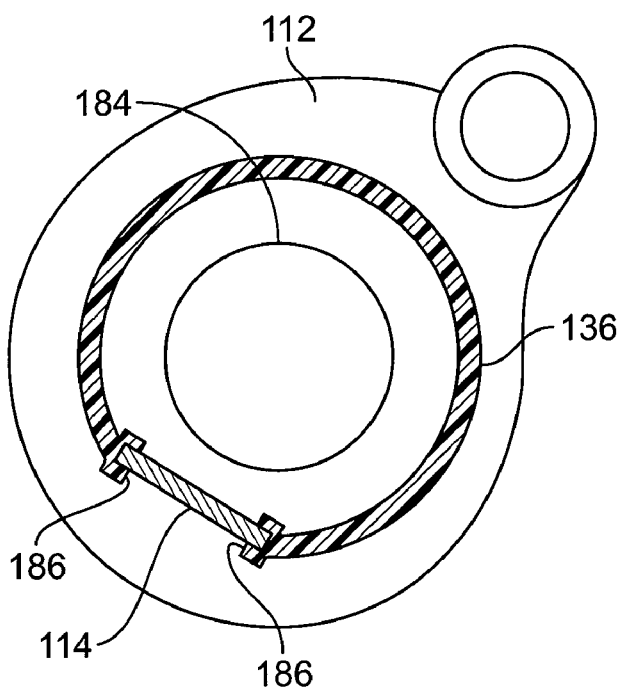
FIG. 11 is a top cross-sectional view of an alternate embodiment of the sump pump of FIG. 9 with the integrated sensor unit mounted in a slot of the pump housing.

In the forms illustrated in FIGS. 9-11, the sensor 114 is disposed in the outer wall of the housing 136 and at least a portion of the outer housing is shown in transparent so that the internal components and sensor 114 can be seen therein. In one form shown in FIGS. 9 and 10, the sensor 114 may be molded directly into the housing wall 136. Alternatively, the sensor 114 may be coupled to the housing by fitting into a slot 186 formed in the housing wall 136. The sensor 114 may have an arcuate configuration to match the curvature of the housing wall 136, as shown in FIG. 10, or it may have a flat configuration, as shown in FIG. 11. The configurations described above are merely examples in accordance with the present invention, and other configurations are contemplated, as would be apparent to those skilled in the art.

Figure 12:
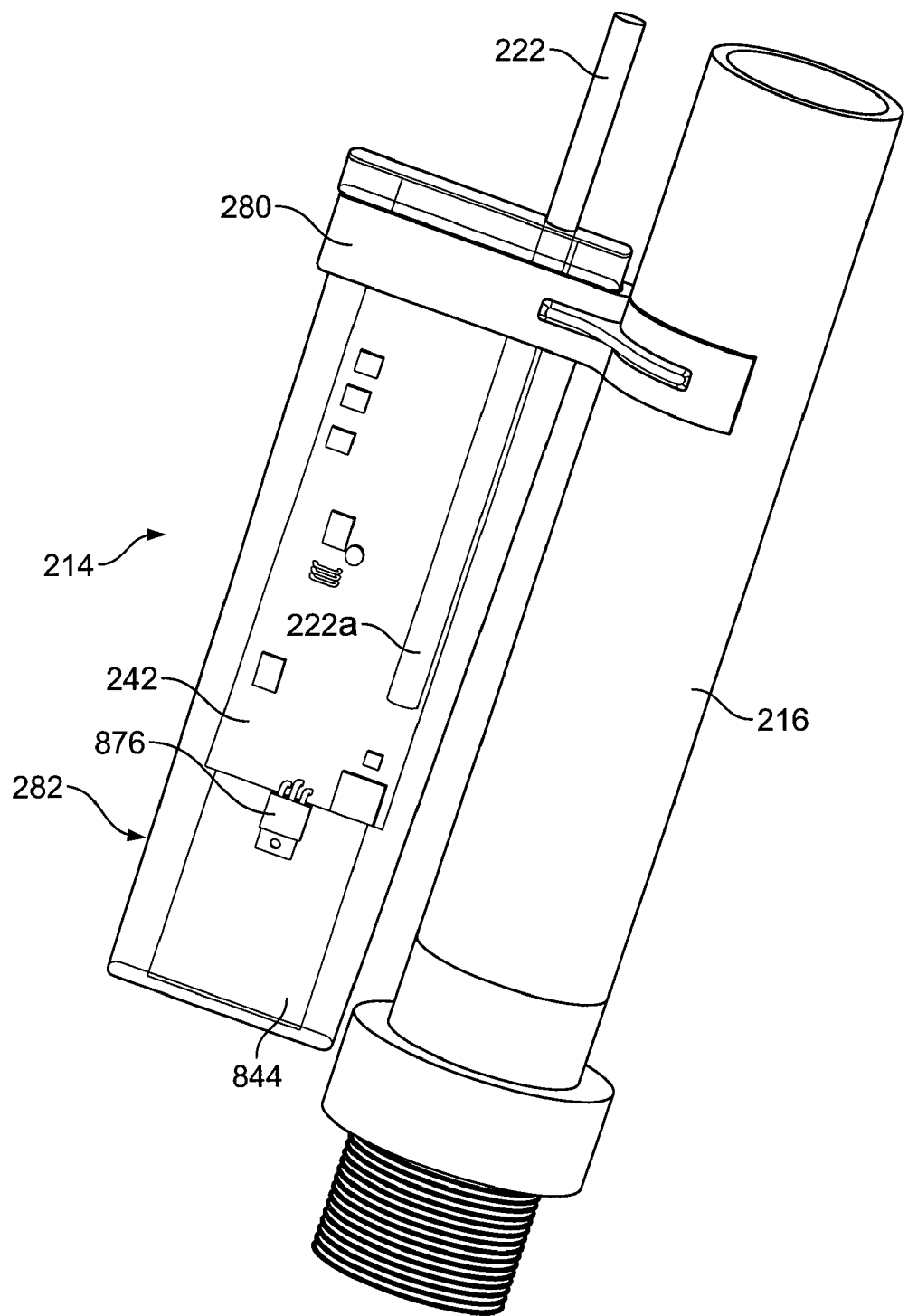
FIG. 12 is an alternate embodiment of a sensor unit in accordance with the invention, showing the sensor unit connected to a discharge pipe rather than the pump housing.
Figure 13:
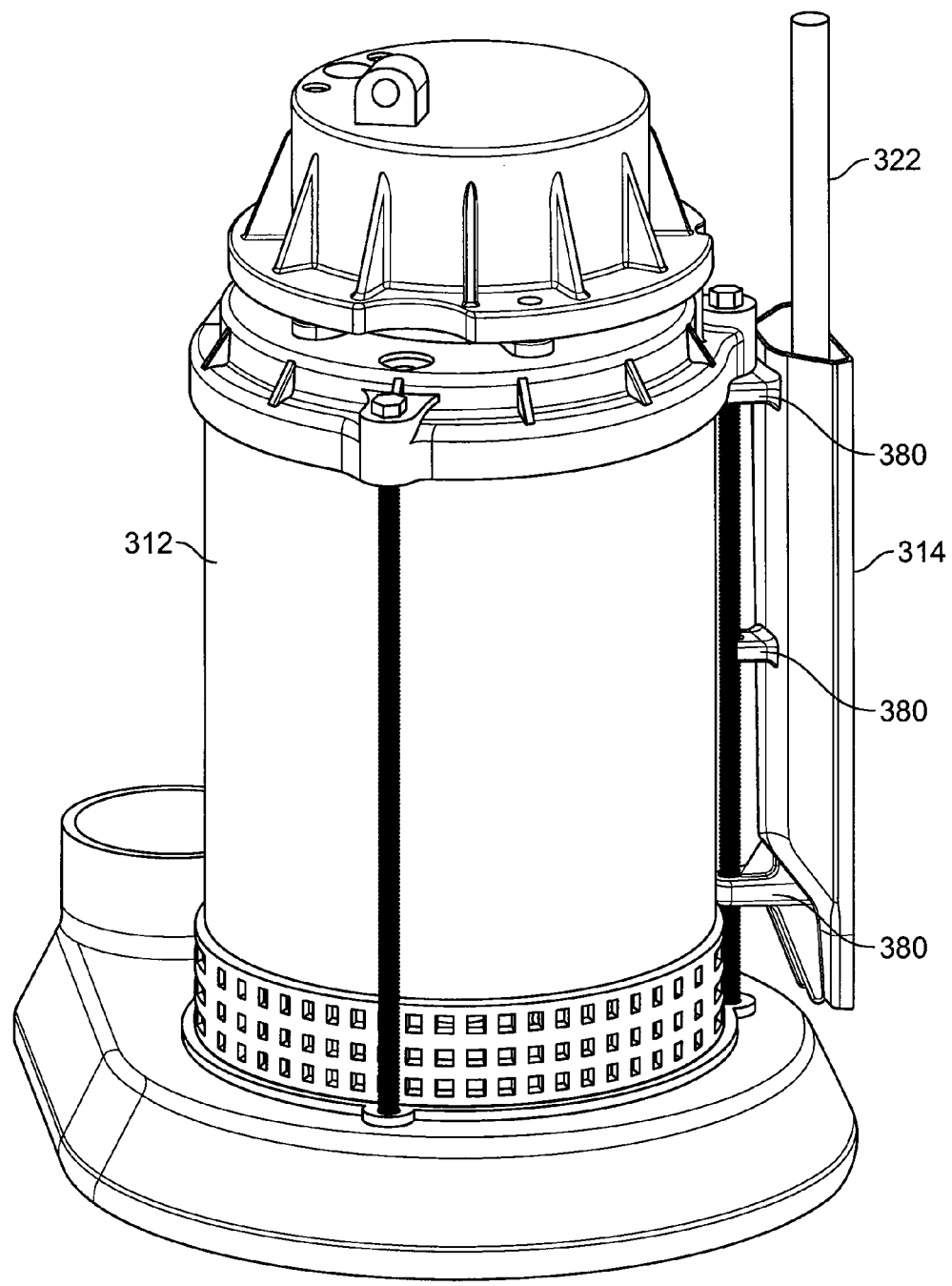
FIG. 13 is a perspective view of yet another embodiment of the pump sensor and configuration for the pump and pump sensor in accordance with the invention.
Figure 14A:
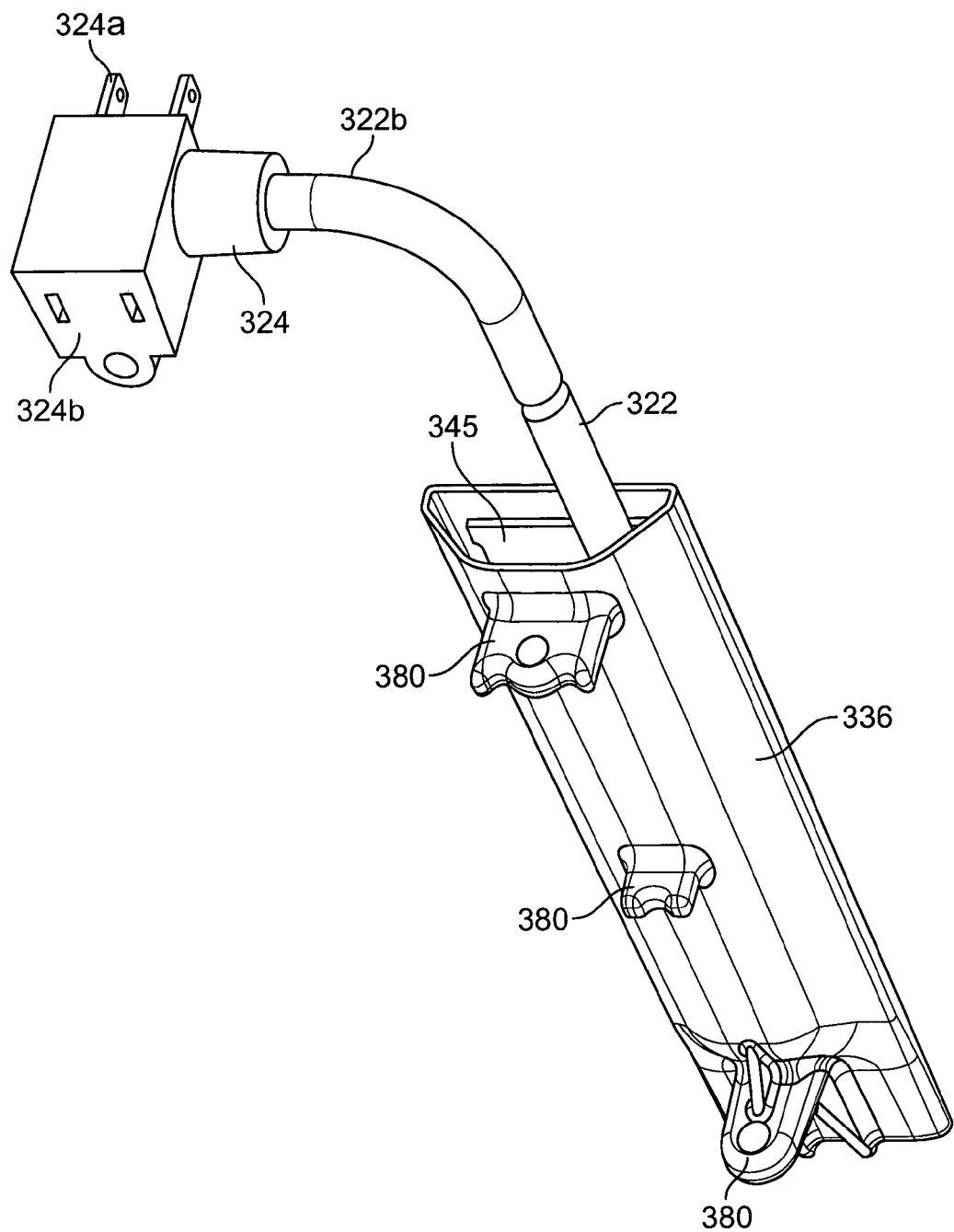
FIGS. 14A, B and C are perspective, front and rear elevational views of the sensor illustrated in FIG. 13.
Figure 15A:
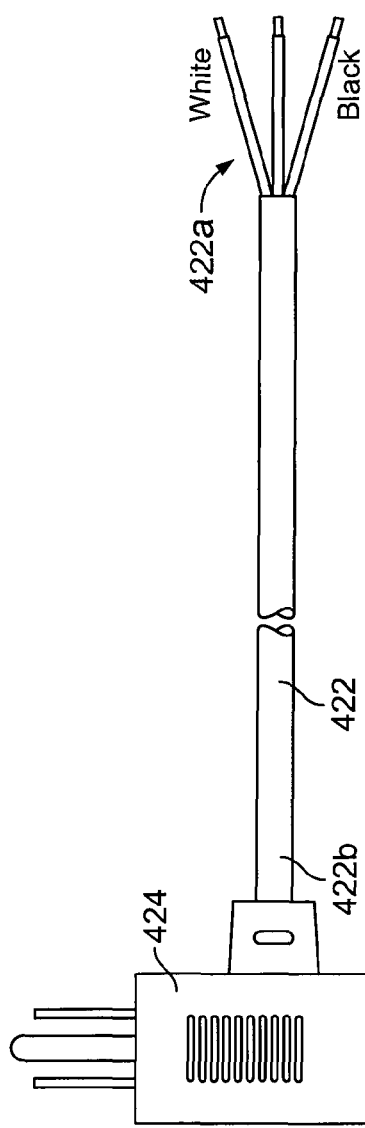
FIGS. 15A-C are top, front and rear elevational views of a piggyback switch cord in accordance with the invention.
Figure 15D:
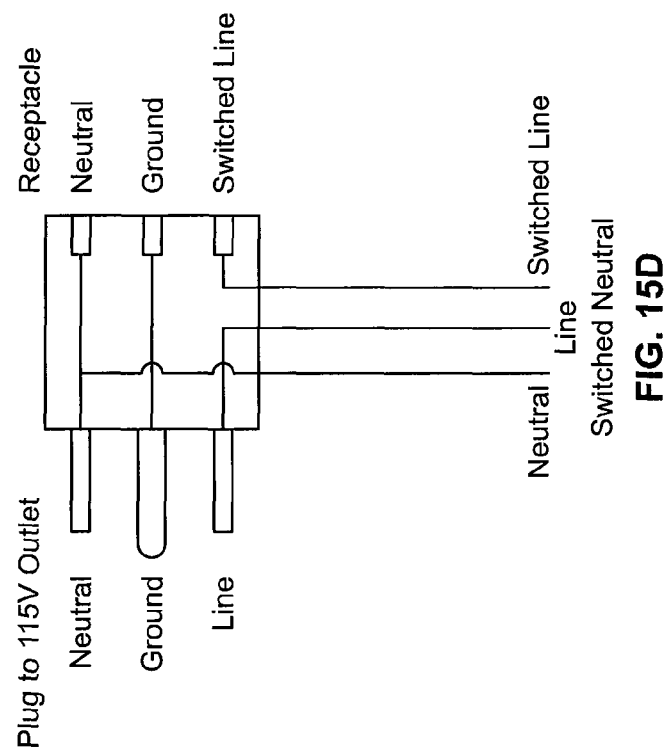
FIG. 15D is a wiring schematic for the piggyback switch cord of FIGS. 15A-C.
Figure 15C:
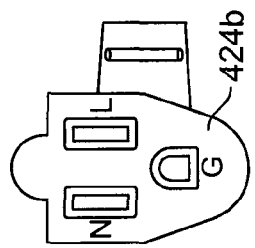
Figure 15B:
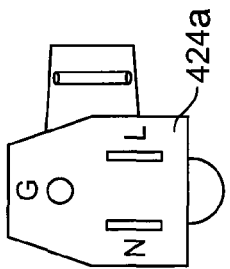

Another embodiment of the pump sensor is illustrated in FIG. 12 and, for convenience, features of this embodiment that correspond to features already discussed with respect to the embodiment of FIGS. 1-11 are identified using the same reference numeral in combination with the prefix "2" merely to distinguish one embodiment from the other, but otherwise such features are similar. In the form illustrated, the capacitive sensor 214 is shown connected to the discharge pipe 216 via a mounting bracket 280. The bracket 280 allows the sensor 214 to be positioned at any desired location on the discharge pipe 216, which allows the operator to determine how much liquid he or she wishes to maintain in the reservoir (not shown). For example, if an operator wishes to maintain a larger amount of liquid in the reservoir, the operator may slide the sensor 214 up the discharge pipe 216 and away from the pump (not shown) so that the predetermined upper limit for the liquid level is reached more slowly. Conversely, if the operator wishes to maintain less liquid in the reservoir, the operator may slide the sensor 214 down the discharge pipe 216 closer to the pump so that the predetermined upper limit for the liquid level is reached faster. In this way, the bracket 280 further allows the operator or installer to account for reservoirs or pits of different sizes and configurations.

An alternate housing 282 is also used for the sensor 214. In the form illustrated, the housing 282 forms more of an elongated sleeve with a longitudinal axis running generally parallel to the pipe 216. In this drawing the housing 282 is shown as being partially transparent so that the circuit board 242 and power cord end 222a of piggyback cord 222 are visible through the housing 282. In a preferred form, however, the housing 282 will be opaque and filled with a suitable potting material for protecting the circuit and circuit components on circuit board 242 from exposure to the liquid in which the sensor 214 is immersed. With this configuration, the length of the housing may be selected based on the pump application. For example, if a longer level sensor plate is desired so that the capacitor may track a larger range of liquid levels, the housing 282 can be elongated to accommodate the larger level sensor plate.

Yet another embodiment of the sensor and configuration for the pump and sensor are illustrated in FIGS. 13 and 14A-D. As has been done before, features of this embodiment that correspond to features already discussed with respect to the embodiment of FIGS. 1-11 are identified using the same reference numeral in combination with the prefix "3" merely to distinguish one embodiment from the other, but otherwise such features are similar. In the form illustrated, the sensor 314 is connected to the pump 312 via a plurality of mounting brackets 380. Although a hollow housing 336 is illustrated so that the circuit board 345 may be seen, the housing 336 will preferably be filled with a potting material to protect the circuit and components on the circuit board 345 from the liquid in which the sensor 314 will be disposed.

FIGS. 15A-D illustrate one form of a piggyback power cord 422 for use with the embodiments illustrated herein and provide a wiring schematic for same. It should be understood, however, that alternate forms of piggyback cords may be provided so long as these cords allow the pump control disclosed herein to complete the circuit between the pump and the power source when a desired liquid level has been reached to activate the pump and break the circuit between the pump and power supply to deactivate the pump.

Although the embodiments illustrated thus far have had the level sensor plate (e.g., 30, etc.) of capacitor 33 located on top and the reference plate (e.g., 32) of capacitor 33 located below the level sensor plate, it should be understood that in alternate embodiments, the level sensor plate may be located below the reference plate. Such a configuration may be particularly advantageous in applications wherein a very minimal amount of liquid is to be monitored and/or maintained. For example, by placing the level sensor plate in the bottom of the capacitive sensor, liquids may be monitored and maintained much closer to the bottom of the pump and/or the bottom surface of the reservoir. In some applications, however, such a configuration will not be desired due to high contamination levels in the liquid causing deposits and/or foaming on the surface of the housing of the sensor opposite the level sensor plate or due to residual surface moisture lingering or being present on the surface of the housing of the sensor opposite the level sensor plate.

These and other concerns may also provide grounds for taking the sampling capacitance at a position slightly below the upper limit and/or well above the bottom of the level sensor plate and calculating a run-time for the pump to operate rather than trying to detect exactly when the liquid has dropped to a desired level on the level sensor plate. For example, if the lower portion of the level sensor plate contains residual surface moisture, this moisture may affect the readings of the capacitor (e.g., 33) and cause the pump control to continue to operate as if the liquid level has not dropped to the desired level on the level sensor plate because the residual water is affecting the capacitance reading of the capacitor.

In light of the foregoing, it should be understood that additional and/or supplemental features and processes are intended to be within the scope of the present invention. For example, the sensor unit 14 may include noise filtering components in order to ensure that the sensor unit 14 operates properly and efficiently. In another alternative form, a temperature sensor may be connected to the SSR 60 in order to limit the run-time of the pump 12. The temperature sensor may monitor the temperature of the opto-triac 74 and/or the switch 76 and, if the device gets too hot, direct the microprocessor 58 to deactivate the pump.

Figure 16:
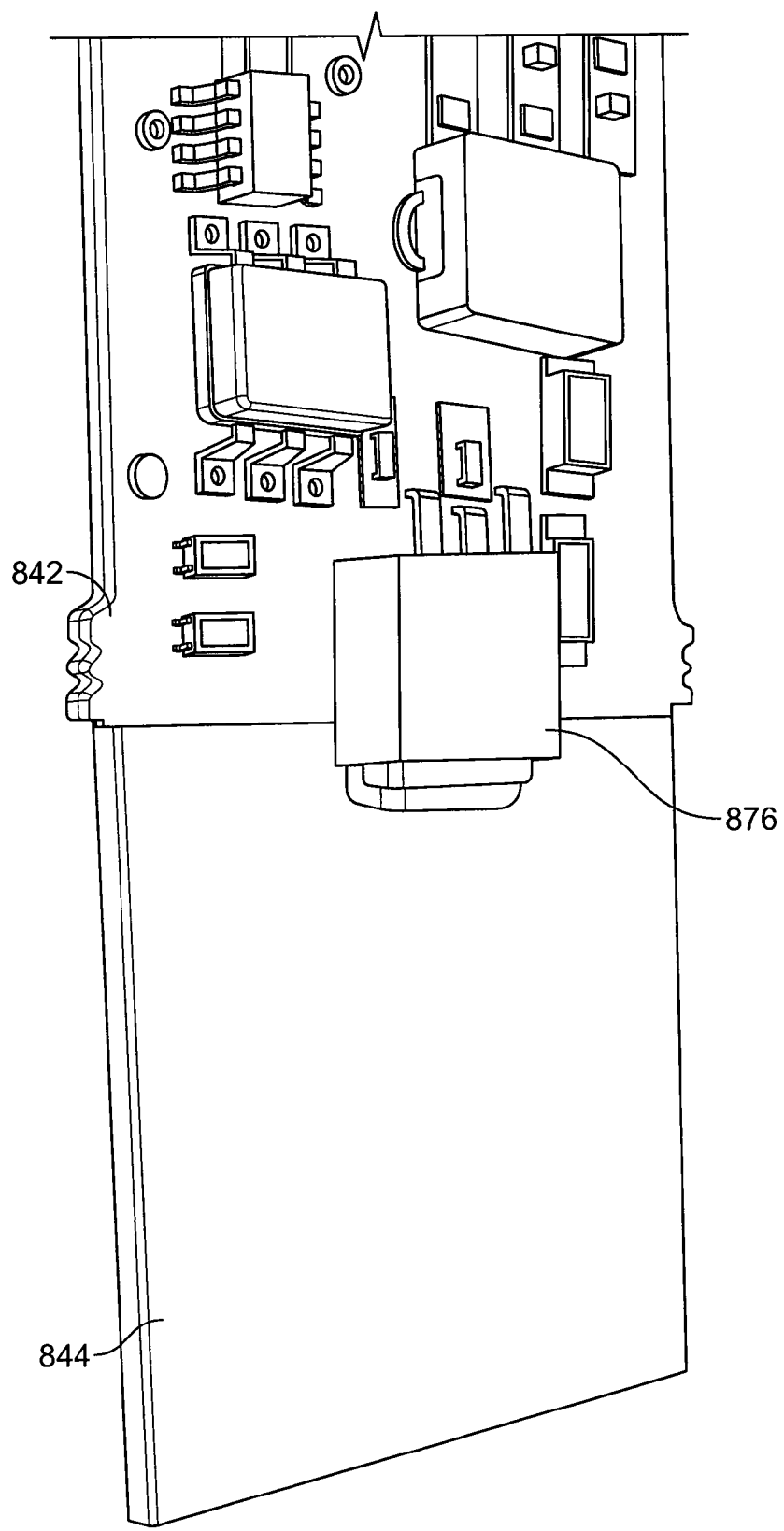
FIG. 16 is an enlarged perspective view of a sensor circuit board in accordance with the invention illustrating a heat sink connected to the circuit board via a circuit component.

In a preferred form shown in FIGS. 12 and 16, a portion of the switch 76 discussed above, which is illustrated as triac 876 in these figures, is mounted to the circuit board 842 and another portion is mounted to a heat sink, such as a copper plate 844, to prevent the switch 876 from overheating. The heat sink is attached to the triac 876 using a surface mount reflow process, which can be undertaken at the same time that the other circuit components are being soldered to the circuit board. This process eliminates a separate process step as well as reduces labor time. In effect, the thermal metallization of the switching device 876 is operable as a thermal and mechanical bridge between the heat sink 844 and the circuit board 842. The heat sink is effectively connected to the circuit board 842 by the triac 876, which also eliminates the need for separate mounting hardware to mount the heat sink, thereby increasing production efficiency. The copper plate 844 is sized such that it has a relatively large surface area to effectively dissipate heat through the potting and sensor housing (not shown) and into the external environment. Preferably, the heat sink is located near the lower end of the housing so that it is more likely to be located below the liquid level. This way, heat produced by the circuit is transferred to the liquid. As a result, heat may be dissipated through the housing much more effectively, because liquid is a much better thermal conductor than air.

It should be noted that different applications and conditions may require the sensor and related components to be manufactured from different materials. For example, the materials used for the power cord and the potting for standard applications (such as sump applications) were found to be less suited for sewage applications. PVC or thermoplastic jackets used on power cords in testing were found to fail tests required to obtain sewage rating under applicable UL requirements. Upon experiment, it was found that rubber or thermoset jackets were preferable to PVC for sewage applications. In addition, the protective material, such as potting, used to protect the electric circuitry of the sensor in standard applications was less suited for sewage applications. However, no potting material suitable for a sewage application could be found that had the desirable flammability rating to meet UL requirements. Therefore, after much experimentation, it was found that using two different potting compounds arranged in layers was effective to meet both flammability and sewage requirements. Therefore, in a preferred form for sewage applications or other applications with similar conditions, the sensor electrical components are first covered with a first potting compound, and then a second potting compound is disposed on at least a portion of the first potting compound. The first potting material is preferably a flame retardant compound, such as EL-CAST FR resin mixed with 44 hardener, manufactured by United Resin. The second potting compound, which forms an outer layer disposed on the first, is preferably an acid-resistant potting compound, such as E-CAST F-28 resin mixed with LB26X92A hardener, also manufactured by United Resin. Thus, in a preferred form, the sensor housing is partially filled with the flame retardant potting compound, and then the second, acid resistant compound is poured into the housing such that the second layer is formed having an approximate thickness in the range of about ⅛ to ¼ inch. As mentioned above, in another form, the second potting compound may be the same composition as the first potting compound. In yet other forms, one or more protective materials effective to protect circuit components may be used as alternatives to one or more potting compounds, as would be apparent to one skilled in the art.

In one example of a typical sump application, the capacitive sensor may be implemented in a conventional battery back-up system. The purpose for the battery back-up in this instance is to allow the pump to continue to pump fluid even when main power is out in a residence or commercial facility. Thus, if the power did go out, the battery back-up system would supply power to the pump so that fluid could be evacuated in order to prevent flooding. Such systems also often include alarms that alert individuals to unusual pump operation, such as high water conditions, continuous running of the pump, overheating pumps, low battery, etc. These alert systems can be hard wired between the pump system and a display or can be wirelessly connected using a transmitter and receiver setup. Typically, the hard wired systems use telephone cable 922 (see FIG. 17) for connecting the pump system to the display and the wireless systems use radio frequency transmitters and receivers. In alternate embodiments, however, other types of cable may be used to hard wire the alert system and other types of convention wireless transmission techniques can be used such as infrared, Bluetooth, etc. In yet other embodiments the wireless system may be connected to a network, such as a LAN or WAN network, so that alerts can be sent via a local area network such as a server or a wide area network such as the Internet.

Figure 17:
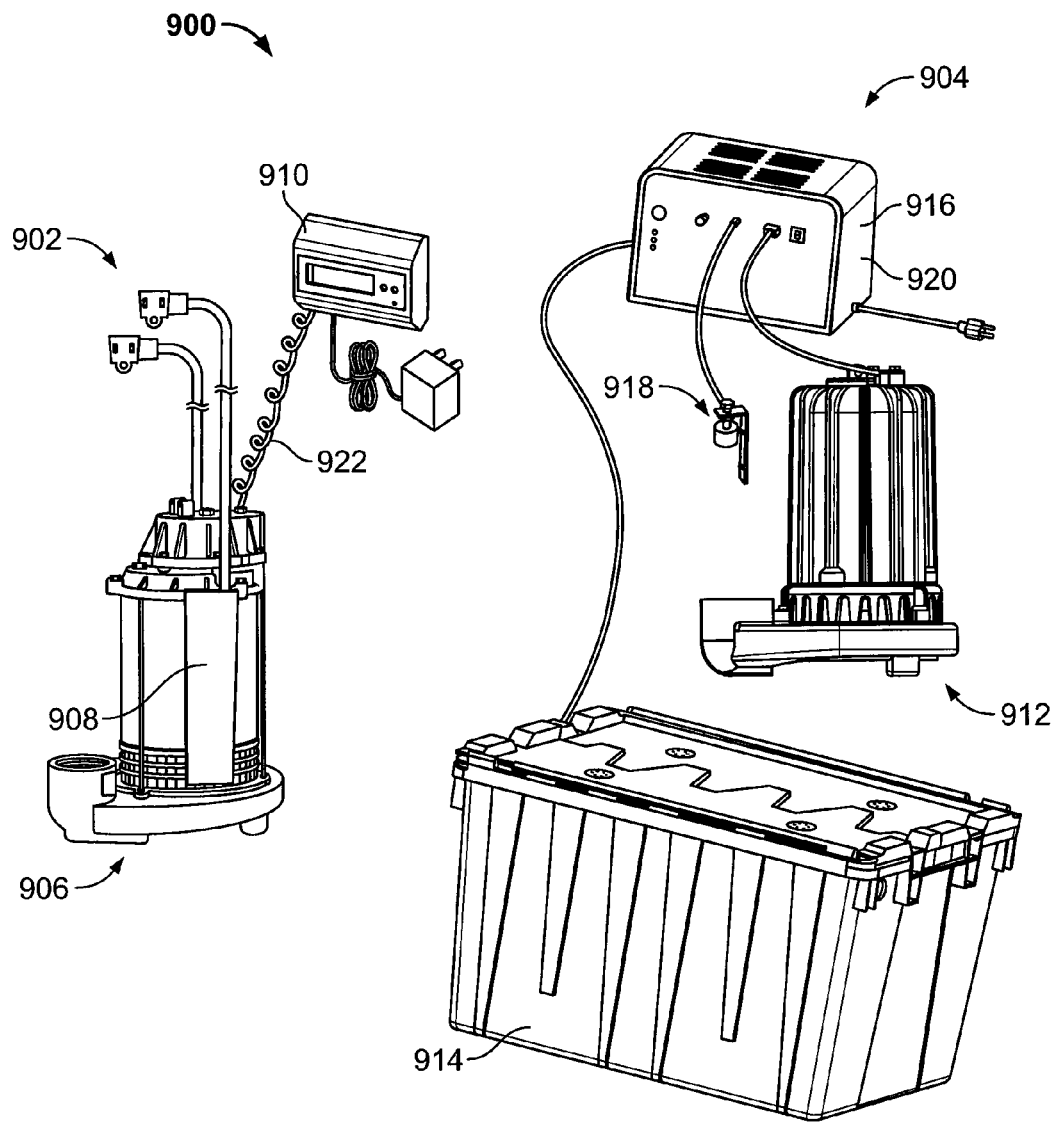
FIG. 17 is a perspective view of a dual pump system with a primary pump system incorporating a sensor unit in accordance with the invention and a battery-powered back-up pump system; the dual pump system includes a wireless or wired alert system including a receiver for informing the user of the status of the system.

In another embodiment illustrated in FIG. 17, the capacitive sensor may be used in a dual pump system 900, such as one having primary and backup pump systems 902, 904. The primary pump system 902 may include a first pump 906 acting as the primary pump, a liquid level sensor, such as a capacitive sensor 908 as described in detail above, and a wired or wireless transmitter for communication with a remote receiver 910 of the pump system 900. The backup pump system 904 includes a second pump 912 acting as a backup, in case of either the failure of the first pump 906 or a power outage as discussed above. The secondary pump 912 is preferably battery-operated, such as a 24-volt direct current (DC) pump. The backup pump system may also include a battery bank or back-up 914 for powering the secondary pump 912, a battery charger 916, a float switch 918, a transmitter 920 and a backup pump controller. The backup system 904 may operate by turning on the secondary pump 912 whenever the liquid level triggers the float switch 918, which is normally placed above the regular high liquid level setting of the primary pump 906. Thus, the backup pump 912 is triggered whenever the liquid rises high enough to trigger the float switch 918, which occurs when the primary pump 906 is not pumping liquid at a sufficient flow rate, such as when the primary pump 906 lacks power or is inoperable, clogged, frozen, etc.

The pump system 900 may include an alert system, which includes the remote receiver 910. The remote receiver 910 may be wired or wireless, and is operable to receive information about the status of the system 900 from one or more transmitters of the system and indicate to the user various system conditions, such as when the primary pump 906 has no power or the liquid sensor (such as the capacitive sensor 908) is sensing a high water level, when the backup pump 912 is running or inoperable, when the battery 914 is low, or when the float switch 918 is sensing high liquid level. In addition, the receiver 910 may indicate when its own battery power is low or dead, or when the receiver 910 has lost AC power. The features described above are meant for illustrative purposes only, as one of ordinary skill in the art would contemplate the numerous applications in which the capacitive sensor described above could be implemented.

In addition, the capacitive sensor discussed herein may be implemented with pumps having known features such as cast iron impellers, top suction intakes, carbon/ceramic shaft seals, and stainless steel motor housing and impeller plates. Further, the sensor may be implemented with pump systems having features such as automatic battery recharging, battery fluid and charge monitors, and controls to automatically run the pump periodically to ensure operation.

Finally, it should be appreciated that the foregoing merely discloses and describes examples of forms of the present invention. It should therefore be readily recognizable from such description and from the accompanying drawings that various changes, modifications, and variations may be made without departing from the spirit and scope of the present invention. For example, although the drawings show the capacitor and sensor discussed herein being used in a sump pump application, it should be understood that such a capacitor and sensor may be used in a variety of different applications and with a variety of different pieces of equipment including, but not limited to, dewatering, sewage, utility, pool and spa equipment, wired or wireless back-up pump systems, well pumps, lawn sprinkler pumps, condensate pumps, non-clog sewage pumps, effluent and grinder pump applications, water level control applications, as well as other non-pump related applications requiring liquid level control.

What is claimed is:

1. A pump control for controlling a liquid level in a reservoir, comprising:
    a pump;
    a controller electrically connected to the pump for activating and deactivating the pump; and
    a capacitor for providing a first capacitance to the controller for activating the pump and a second capacitance to the controller for deactivating the pump, the capacitor having first and second electrodes with at least a portion of the first electrode positioned above the second electrode so that the first electrode is fully immersed in the liquid before the second electrode is fully immersed in the liquid as the liquid level rises in the reservoir.

2. The pump control of claim 1, wherein the first capacitance corresponds to a first liquid level in the reservoir and the second capacitance corresponds to a second liquid level in the reservoir.

3. The pump control of claim 1, wherein the controller determines a run-time based on when the second capacitance was detected relative to when the first capacitance was detected, the run-time being an amount of time the pump should be activated to move a predetermined amount of the liquid out of the reservoir.

4. The pump control of claim 3, wherein the controller deactivates the pump after the run-time passes.

5. The pump control of claim 1, wherein the controller deactivates the pump upon detecting the second capacitance from the capacitor.

6. The pump control of claim 1, wherein the capacitor is a variable capacitor capable of providing a plurality of different capacitances with each capacitance corresponding to a different liquid level in the reservoir.

7. The pump control of claim 6, further comprising a power source generating an alternating current and wherein the controller detects the capacitance of the capacitor each time the alternating current is at a zero-crossing.

8. The pump control of claim 1, further comprising a secondary pump system comprising a pump and a liquid level sensor.

9. The pump control of claim 8, wherein the secondary pump system includes a wireless receiver for receiving information about at least the secondary pump system transmitted by a transmitter operably connected to the pump of the secondary pump system.

10. The pump control of claim 1, wherein
    the pump is for moving a liquid out of a reservoir; and
    the controller electrically connected to the pump for activating the pump determines a run-time for the pump in order to move a desired amount of the liquid out of the reservoir.

11. The pump control of claim 10, wherein the run-time is based on a rate of flow of the liquid out of the reservoir.

12. The pump control of claim 10, further comprising a sensor in communication with the controller for detecting a first condition for activating the pump and a second condition for determining the run-time.

13. The pump control of claim 12, wherein the sensor includes at least one magnet and at least one magnetic sensor.

14. The pump control of claim 12, wherein the sensor includes at least one capacitive sensor.

15. The pump control of claim 14, wherein the at least one capacitive sensor includes a variable capacitor for generating a plurality of different capacitances with each capacitance corresponding to a different liquid level in the reservoir.

16. The pump control of claim 14, wherein the at least one capacitive sensor includes a first capacitor for providing an activation signal to the controller and a second capacitor for providing a deactivation signal to the controller.

17. A pump control for controlling a level of a liquid in a reservoir, the pump controller comprising:
    a pump for being selectively activated to move the liquid out of the reservoir;
    a power supply electrically connected to the pump for providing an alternating current to the pump when activated;
    a sensor disposed at least partially within the reservoir for detecting the level of the liquid in the reservoir; and
    a controller electrically connected to the sensor and between the pump and power supply, the controller obtaining the detected liquid level from the sensor when the alternating current of the power supply is at a zero-crossing to determine if the pump should be activated.

18. The pump controller of claim 17, wherein the controller determines when to activate the pump when a first liquid level is detected and determines when to deactivate the pump when a second liquid level is detected.

19. The pump control of claim 18, wherein the controller deactivates the pump after a run-time has expired, the run-time being determined when the second liquid level is detected.

20. The pump control of claim 18, wherein the controller deactivates the pump when the second liquid level is detected.

21. The pump control of claim 18, wherein the first and second liquid levels are detected by a capacitive sensor.

22. The pump control of claim 21, wherein the capacitive sensor includes a variable capacitor that provides a plurality of different capacitances with each capacitance corresponding to a different level of the liquid in the reservoir.

23. The pump control of claim 21, wherein the capacitive sensor detects a first capacitance for determining when the pump should be activated and a second capacitance for determining when the pump should be deactivated.

24. The pump control of claim 17, further comprising a sensor housing in which the sensor and controller are disposed; and a protective material disposed in the sensor housing to protect at least the controller from liquid.

25. The pump control of claim 24, wherein the protective material comprises a plurality of potting compounds having different properties.

26. A pump control for controlling a liquid level in a reservoir, comprising:

a pump;

a controller electrically connected to the pump for activating and deactivating the pump;

a capacitor for providing a first capacitance to the controller for activating the pump and a second capacitance to the controller for deactivating the pump; and wherein the controller determines a run-time based on when the second capacitance was detected relative to when the first capacitance was detected, the run-time being an amount of time the pump should be activated to move a predetermined amount of the liquid out of the reservoir.

27. The pump control of claim 26, wherein the controller deactivates the pump after the run-time passes.

28. The pump control of claim 26, wherein the capacitor is a variable capacitor capable of providing a plurality of different capacitances with each capacitance corresponding to a different liquid level in the reservoir, the pump control further comprising a power source generating an alternating current and wherein the controller detects the capacitance of the capacitor each time the alternating current is at a zero-crossing.

29. The pump control of claim 26, further comprising a secondary pump system comprising a pump and a liquid level sensor.

30. The pump control of claim 29, wherein the secondary pump system includes a wireless receiver for receiving information about at least the secondary pump system transmitted by a transmitter operably connected to the pump of the secondary pump system.

* * * * *

UNITED STATES PATENT AND TRADEMARK OFFICE
CERTIFICATE OF CORRECTION

| | | |
|---|---|---|
| PATENT NO. | : 8,380,355 B2 | Page 1 of 1 |
| APPLICATION NO. | : 12/049906 | |
| DATED | : February 19, 2013 | |
| INVENTOR(S) | : Philip Anthony Mayleben and Thomas Richard Stetter | |

It is certified that error appears in the above-identified patent and that said Letters Patent is hereby corrected as shown below:

IN THE CLAIMS:

In Claim 18, Column 16, Line 54, delete "controller" and insert -- control --, therefor.

Signed and Sealed this
Twenty-third Day of July, 2013

Teresa Stanek Rea
*Acting Director of the United States Patent and Trademark Office*